US007655151B2

(12) United States Patent
Martin

(10) Patent No.: US 7,655,151 B2
(45) Date of Patent: Feb. 2, 2010

(54) METHOD OF OPERATING A FLUID TREATMENT DEVICE EMPLOYING A NON-BONDED MEDIA

(76) Inventor: John D. Martin, 4303 Seymour Hwy., Wichita Falls, TX (US) 76309

(*) Notice: Subject to any disclaimer, the term of this patent is extended or adjusted under 35 U.S.C. 154(b) by 442 days.

(21) Appl. No.: 10/560,700

(22) PCT Filed: Jun. 12, 2004

(86) PCT No.: PCT/US2004/018654

§ 371 (c)(1),
(2), (4) Date: Dec. 13, 2005

(87) PCT Pub. No.: WO2005/000745

PCT Pub. Date: Jan. 6, 2005

(65) Prior Publication Data

US 2006/0175262 A1 Aug. 10, 2006

Related U.S. Application Data

(60) Provisional application No. 60/478,254, filed on Jun. 13, 2003, provisional application No. 60/484,097, filed on Jul. 1, 2003, provisional application No. 60/562,202, filed on Apr. 14, 2004, provisional application No. 60/562,927, filed on Apr. 16, 2004.

(51) Int. Cl.
*B01D 37/00* (2006.01)

(52) U.S. Cl. ........................ 210/793; 210/807

(58) Field of Classification Search ................. 210/277, 210/281, 288, 289, 446, 670, 678, 793, 792, 210/807
See application file for complete search history.

(56) References Cited

U.S. PATENT DOCUMENTS

| 1,671,864 A | 5/1928 | Higgins |
| 1,993,142 A | 3/1935 | Johnson |
| 3,415,382 A | 12/1968 | Martin |
| 3,458,436 A | 7/1969 | Martinola et al. |
| 3,568,833 A | 3/1971 | Ritzen |
| 4,009,102 A * | 2/1977 | Davis ........................ 210/675 |
| 4,019,985 A | 4/1977 | Fuller et al. |

(Continued)

FOREIGN PATENT DOCUMENTS

WO WO 99/36110 * 7/1999

OTHER PUBLICATIONS

"Precision Glass-Bed Filter" product brochure (8 pages).

(Continued)

*Primary Examiner*—Matthew O Savage
(74) *Attorney, Agent, or Firm*—Roger N. Chauza, P.C.

(57) ABSTRACT

A fluid treatment and media management device having concentric inner and outer perforated cylinders defining a chamber therebetween for containing a media. A case surrounds the perforated cylinders and forms an annular space between the case and the outer perforated cylinder. Respective end caps engage the opposite ends of the case and perforated cylinders to support such members. One or both of the end caps provide ports to the central core of the inner perforated cylinder, to the media chamber and to the annular space. The media can be removed from the fluid treatment and media management device without disassembly of the device for the purpose of disposal and/or regeneration of the media.

14 Claims, 17 Drawing Sheets

U.S. PATENT DOCUMENTS

| | | | |
|---|---|---|---|
| 4,021,339 A | | 5/1977 | Foody |
| 4,178,249 A | * | 12/1979 | Councill .................. 210/281 |
| 4,643,836 A | | 2/1987 | Schmid |
| 6,322,704 B1 | * | 11/2001 | Martin .................. 210/661 |
| 6,852,232 B2 | | 2/2005 | Martin |

OTHER PUBLICATIONS

"Glass-Bed Precsion Filters" product brochure, 1976 (12 pages).

* cited by examiner

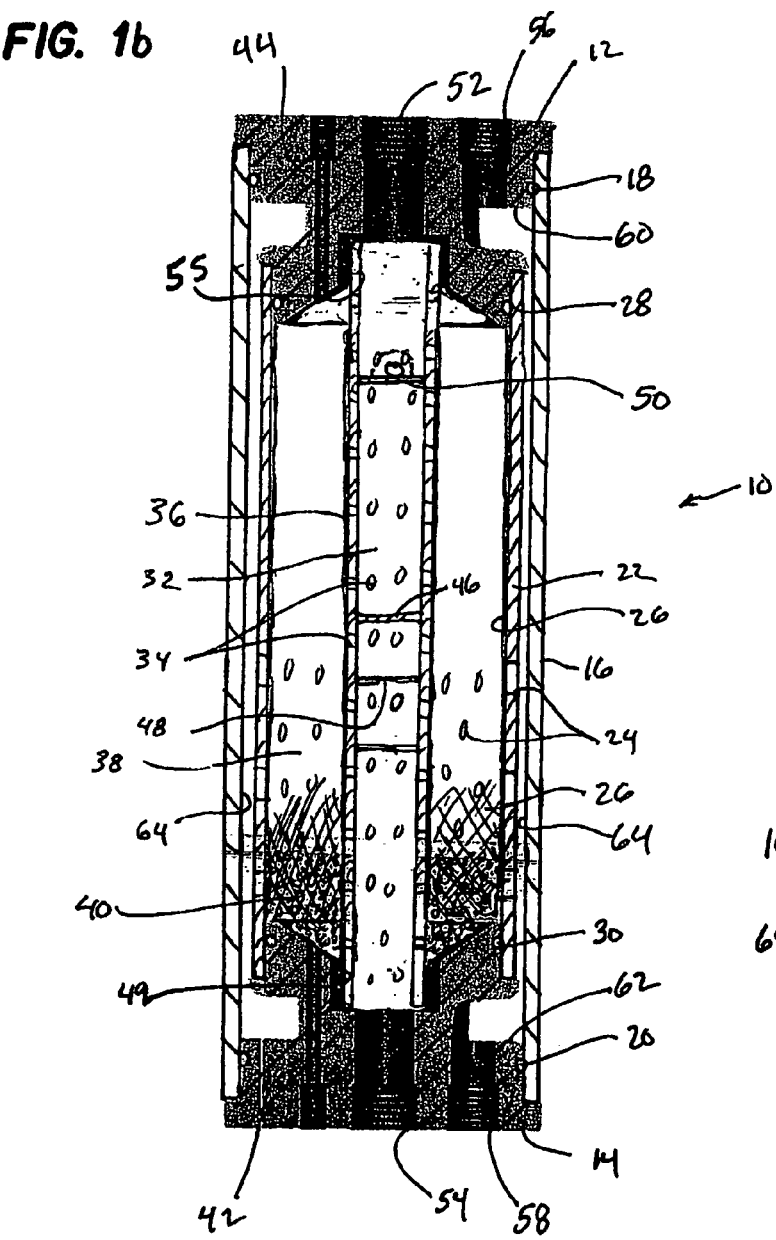
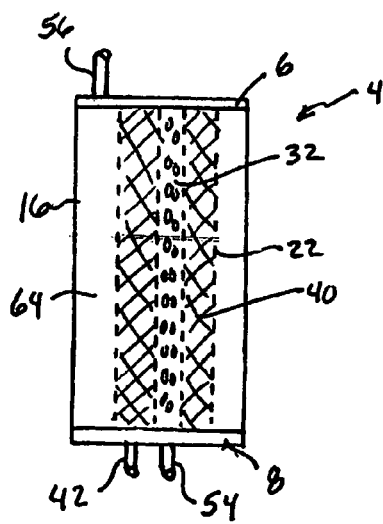

METHOD OF OPERATING A FLUID TREATMENT DEVICE EMPLOYING A NON-BONDED MEDIA

RELATED APPLICATIONS

This patent application claims the benefit of the following U.S. Provisional Applications:
1) Ser. No. 60/478,254, filed Jun. 13, 2003, by John D. Martin;
2) Ser. No. 60/484,097, filed Jul. 1, 2003, by John D. Martin;
3) Ser. No. 60/562,202, filed Apr. 14, 2004, by John D. Martin; and
4) Ser. No. 60/562,927, filed Apr. 16, 2004, by John D. Martin and David Bromley.

The disclosures of each provisional is incorporated herein by reference.

TECHNICAL FIELD OF THE INVENTION

The present invention relates in general to radial flow filters and media management systems, and more particularly to systems in which filter and coacting media can be removed from the system and regenerated.

BACKGROUND OF THE INVENTION

There are many occasions where liquids are processed to change the characteristics thereof. For example, liquids are frequently filtered to remove particulate matter therefrom. Liquids are also coacted with other materials to remove or otherwise alter the chemical composition of the liquids. In like manner, gasses can be processed to purify the same or change the chemical composition thereof.

Fluids can be processed in the foregoing manner by forcing the same through a media selected to achieve the desired result on the fluid. The processing of the fluids is often carried out by placing the media in a container, and passing the fluid, or influent, through the container to coact the fluid with the media. The output of the container is a fluid, or effluent, that is altered in the manner desired.

After a period of time, the media may become spent or exhausted, in that it can no longer provide the desired result on the fluid. In this event, the media must be either regenerated or replaced with new media. When removing particulate matter from a liquid, the media may be a non-bonded media, or other type of media that traps the particulate matter between the interstices of the media. The non-bonded media can be replaced with fresh media. Alternatively, the spent media can be regenerated by a backwash cycle to remove the particulate matter so that the media can again separate the particulate matter from the liquid.

Non-bonded media, i.e., powder, granular or beads, or other similar types of media can be employed to chemically alter liquids forced therethrough. In water softening equipment, the media provides an exchange of ions with the water processed therethrough so that the output of the equipment is soft water. In this type of processing apparatus, when the media is no longer effective to remove a majority of the ions from the hard water, the media undergoes a regeneration cycle. The regeneration cycle involves a period of time in which the equipment is off line, and a regenerating liquid, such as a salt brine, is passed through the spent media to remove the hardness ions therefrom.

In yet another application, water is passed through a media to remove undesired contaminants and/or chemicals therefrom, such as heavy metals, arsenic, etc. The media selected is of the type that can chemically remove the undesired material from the water to provide a more purified water that is free from the undesired chemicals. When the media becomes ineffective to remove the detrimental chemicals, either a fresh media can replace the spent media, or the spent media can be regenerated by processes that remove the undesired materials from the media. There are many other applications where the use of a media is beneficial to alter the composition of the fluid passed therethrough.

There are commercially available media-based systems that are effective to produce the desired result on the fluid passed therethrough. When the media is spent, the entire container and media held therein is discarded and a new fluid processing system is installed. It can be appreciated that in most situations, especially where large quantities or volumes of fluids are to be processed, it is more cost effective to provide a regeneration cycle for the media. This type of system reuses the media over and over, at the expense of being off line for the time the spent media is regenerated. These systems are generally more sophisticated and complicated, and allow the spent media to be brought into contact with the regeneration fluid. Nevertheless, it has been established that a system that is capable of regenerating the media is superior to the media replacement systems, primarily because of long term savings in material and labor costs and expenses.

In view of the importance placed on the removal of undesirable elements from fluids used directly or indirectly by people, it can be seen that a need exists for improved fluid and media processing systems that are less complicated, more cost effective, and of the type that are capable of providing regeneration of the media contained therein.

SUMMARY OF THE INVENTION

In accordance with the principles and concepts of the invention, disclosed is a fluid treatment and media management device that overcomes many of the shortcomings and problems attendant with the prior art devices.

In accordance with one embodiment of the invention, a fluid treatment and media management device includes a particulate media for treatment of an influent. The device includes one or more media access channels therein for allowing the particulate media to be removed therefrom, regenerated, and replaced back in the device.

In accordance with another feature of the invention, a fluid treatment and media management device includes a number of cylindrical members, defined by an inner perforated cylinder, an outer perforated cylindrical, and a cylindrical case. A top and bottom end cap support the cylindrical members therebetween. One or both end caps allow an influent to be coupled to a treatment media contained therein, and for exit of an effluent therefrom. A media access channel is also formed in one or both end caps for exchange of the media therein without disassembly of the fluid treatment and media management device.

In accordance with another aspect of the invention, various cylindrical members of the fluid treatment and media management device can be made in substantially identical molded segments to form a tubular cylinder.

In accordance with yet another feature of the invention, a multiport valve is disclosed for replacement of a number of individual solenoid-operated valves. The multiport valve maintains separate isolated ports to prevent contamination of the fluids carried therethrough.

In accordance with yet another embodiment of the invention, disclosed is a fluid treatment and media management device employing a non-bonded media. The device includes a media column defined by a spaced apart members adapted for containing the media therebetween, where the members are arranged so that an influent flows through the members and the non-bonded media. Included is a first member adapted for allowing the influent to flow therethrough and then through the non-bonded media to produce an effluent, and a second member adapted for allowing the effluent to flow therethrough. An outlet of the media column is adapted for allowing the non-bonded media to be removed from the media column without disassembly of the fluid treatment and media management device.

With regard to yet another feature of the invention, disclosed is a fluid treatment and media management device employing a non-bonded media, which includes an inner and outer perforated cylinder, where the inner perforated cylinder have a central core. The inner perforated cylinder is concentric with the outer perforated cylinder, and a space between the inner and outer perforated cylinders is adapted for containing the non-bonded media. The space defines a media chamber. Further included is a case encircling the first and second perforated cylinders, and the case is spaced apart from the second perforated cylinder to provide an annular area. A first end cap and a second end cap engage opposite ends of the case to provide an enclosed housing around the inner and outer perforated cylinders, and the end caps engage opposite ends of the inner and outer perforated cylinders to provide support thereto. At least one of the end caps has an inlet port for carrying an influent to the annular area, at least one end cap has an outlet port for carrying an effluent from the central core of the inner perforated cylinder.

According to another embodiment, disclosed is a method of treating a fluid with a non-bonded media. The method includes the steps of passing the fluid through a fluid treatment and media management device and through the non-bonded media, once the non-bonded media is ineffective to treat the fluid, removing the non-bonded media from the fluid treatment and media management device without disassembly thereof; and the step of removing the non-bonded media includes transferring the non-bonded media out of the fluid treatment and media management device through a media access channel.

According to a further embodiment, disclosed is a fluid treatment and media management device employing a non-bonded media. The device includes a case for housing the non-bonded media, an inlet formed in the case for admitting an influent into the case, an outlet formed in the case for exit of an effluent from the case, and a media access channel coupled to the non-bonded media, where the media access channel is adapted for allowing the non-bonded media to be removed from from the case without disassembly of the fluid treatment and media management device.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, functions or elements throughout the views, and in which:

FIG. 1a illustrates in simplified form a fluid treatment and media management device employing the features of the invention;

FIG. 1b is an embodiment of a fluid processing system employing a media regeneration chamber in the device, and with capabilities of injecting and removing the media from the device;

DETAILED DESCRIPTION OF THE INVENTION

Figure 2:
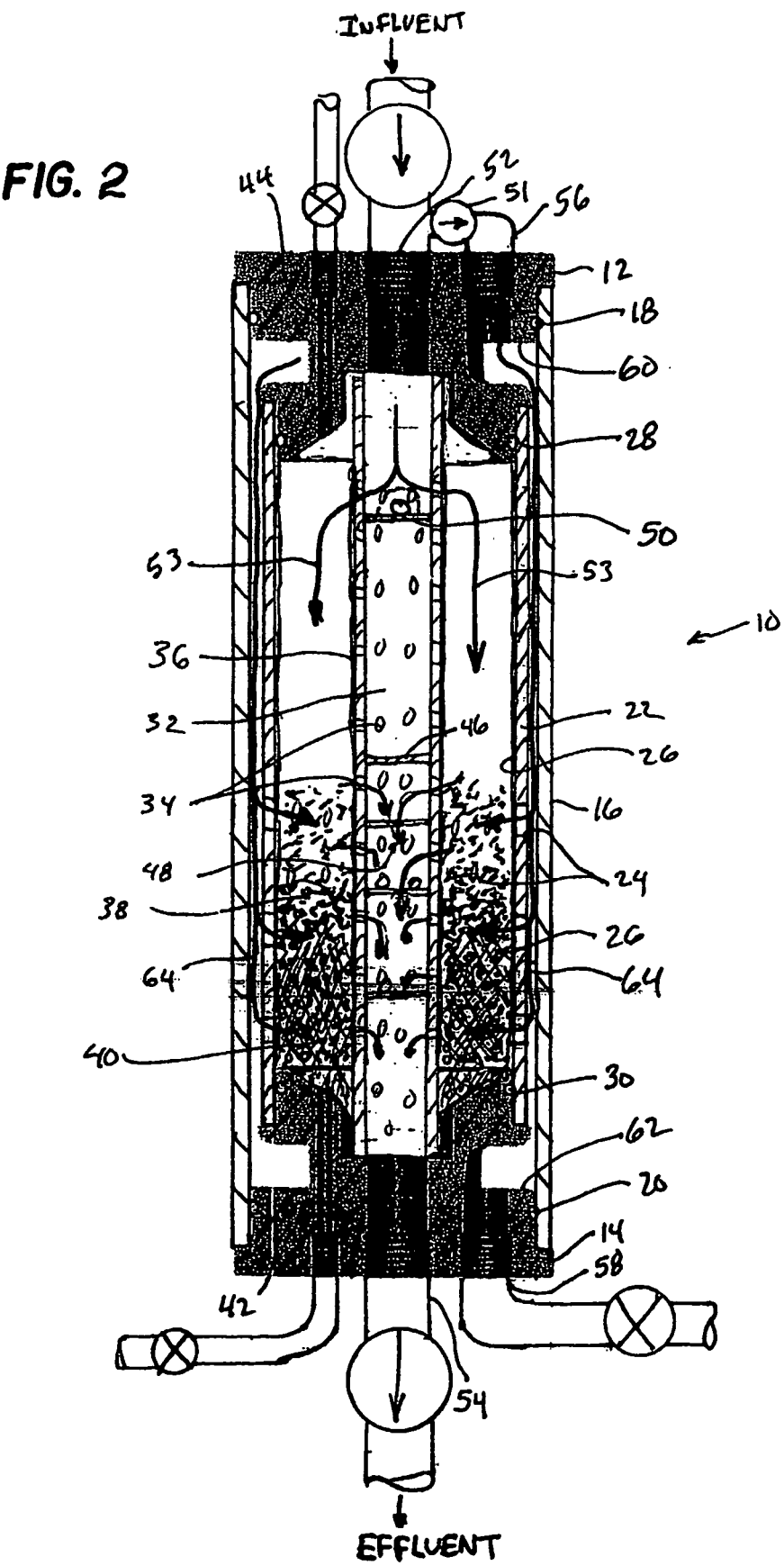
FIG. 2 illustrates the fluid processing system of FIG. 1b, in a media contact cycle.

FIG. 1a illustrates the principles and concepts of a basic form of the invention adapted for treating a fluid, and more preferably a liquid. The fluid treatment and media management device 4 includes a case 16 capped on each end with respective end caps 6 and 8. Supported between the end caps 6 and 8, inside the case 16, is an inner perforated cylinder 32 surrounded by an outer perforated cylinder 22. A space between the inner perforated cylinder 32 and the outer perforated cylinder 22 defines a media chamber for holding a treatment media 40 therebetween. The annular space between the outer perforated cylinder 22 and the case 16 defines an annular area 64 for input of an influent to be treated by the media 40. The various embodiments of the invention disclosed herein preferably utilize a non-bonded media, such as any granular media, any particulate media, any bead-type media, any powder media, and the like. As defined herein, a non-bonded media is of the type that is capable of treating a fluid, and is not of a paper-type or other similar class of filter elements.

An annulus port 56 is provided to couple the influent to the annular area 64 of the fluid treatment and media management device 4. The annulus port 56 can be placed anywhere on the case or caps 6 and 8 to couple the influent to the annular area 64 which encircles the outer perforated cylinder 22. In some applications, there may not be any need for a case 16, such as when immersed in a liquid, and where a sufficient hydrostatic head exists to move the liquid through the media. In any event, the influent passes radially through the column of media 40 to the core of the inner perforated cylinder 32. The treated influent then passes out of the fluid treatment and media management device 4 via a central port 54. The central port 54 can be located at the bottom or top of the caps 6 or 8, in communication with the core of the inner perforated cylinder 32. A media access channel 42 is coupled to the media chamber for allowing the treatment media 40 to be placed in the media chamber, or removed therefrom. The media access channel 42 is preferable located at the bottom of the fluid treatment and media management device 4, but could be placed at the top. With this arrangement, the media 40 can be replaced with new media, once the old media 40 is spent. Alternatively, the spent media can be removed from the fluid treatment and media management device 4, regenerated externally, and then replaced back in the media column, preferably as a slurry. However, a dry non-bonded media can be injected into the fluid treatment and media management device by the use of gravity, such as by pouring the dry media into the media access channel 44, or by the use of an air stream carrying the dry non-media into the fluid treatment and media management device. A dry non-bonded media can also be removed from the fluid treatment and media management device via the media access channel 42 in a similar manner. Those skilled in the art may also prefer to remove the dry non-bonded media through the top media access channel 44, and inject the dry non-bonded media into the fluid treatment and media management device via the bottom media access channel 42.

Although the various embodiments disclosed herein employ a radial flow type of fluid treatment and media management device, other types of fluid treatment and media management devices can employ a media access channel connected to the media chamber to remove and/or replace the non-bonded media therein. To that end, axial flow fluid treatment and media management devices can utilize one or more media access channels to move the media out of or into the device with out disassembly of the device. In addition, while the embodiment of FIG. 1a illustrates the use of end caps 6 and 8, such end caps can be welded or otherwise formed integral with the case 16 once the media support structure is assembled therein. The media 40 can be easily injected or removed from the media chamber by way of the media access channels.

With reference to FIG. 1b, there is illustrated another fluid treatment and media management device 10 according to one embodiment of the invention. In practice, the fluid treatment and media management device 10 may be much longer in length, up to about six foot, or longer. The fluid treatment and media management device 10 can be constructed in sections, each about four inches in length. Thus, to manufacture fluid treatment and media management devices 10 of different lengths, a different number of sections would be utilized. The sections can have male/female ends which can be solvent welded or spin welded together to provide a reliable integral structure. Preferably, two sections would be added together, one associated with a filter end and one associated with a backwash end of the device.

The fluid treatment and media management device 10 includes a top end cap 12 and a bottom end cap 14. Both top and bottom end caps 12 and 14 may be constructed in a substantially identical manner, using the same mold. The end caps 12 and 14 can be constructed of plastic, metal or other suitable material. In one embodiment adapted for use with a water-based influent, the moldable material comprises a durable type of plastic. One end cap 12 is shown in more detail in FIGS. 4a-4c, it being realized that the other end cap 14 is substantially identical in construction. This allows the same end cap to be used at both ends of the fluid treatment and media management device 10, thereby lowering the inventory and manufacturing costs of the device.

Supported between the end caps 12 and 14 is a cylindrical case 16 that is supported between respective annular recesses in the top and bottom end caps 12 and 14. The case 16 can be welded or threaded to the top and bottom end caps 12 and 14 to constrain an inner perforated cylinder 32 and an outer perforated cylinder 22 between the end caps 12 and 14. O-rings 18 and 20 provide a fluid seal between the case 16 and the top and bottom end caps 12 and 14. Rather than using O-rings, an alternative could be welding, bonding and/or potting the parts together.

The top and bottom end caps 12 and 14 further include other respective annular recesses for supporting therebetween the outer perforated cylinder 22. The outer perforated cylinder 22 may be plastic or metal with large openings 24 formed therein. In this embodiment, the openings 24 are formed only in the bottom half of the outer perforated cylinder 22. A screen 26 is attached to the inside surface of the outer perforated cylinder 22. Optionally, rather than using a screen, the outer perforated cylinder 22 can be constructed with small holes or perforations therein to contain the media 40. O-rings 28 and 30 provide a fluid seal between the outer perforated cylinder 22 and the respective top and bottom end caps 12 and 14.

The inner perforated cylinder 32 is supported within respective bores 49 and 55 formed centrally in the top and bottom end caps 12 and 14. O-rings (not shown) provide a fluid seal between the top and bottom ends of the inner perforated cylinder 32 and the respective bores of the top and bottom end caps 12 and 14. Large perforations 34 are formed in the inner perforated cylinder 32 from the top to the bottom thereof. A screen 36 is attached to the outer surface of the inner perforated cylinder 32. Again, rather than using a screen, the inner perforated cylinder 32 can be constructed with small holes or perforations to contain the media 40.

An annular media chamber 38 is located between the inner screen 36 of the inner perforated cylinder 32 and the outer screen 26 of the outer perforated cylinder 22. The treatment media 40 can partially fill the annular media chamber 38. A media, such as beads, activated carbon, particulate zirconium or any other treatment material 40 can be carried to the device 10 to partially fill the annular media chamber 38. In another embodiment to be described below, the treatment media substantially fills the media chamber 38. Preferably, the media 40 is carried to the fluid treatment and media management device 10 in a slurry by way of an arrangement of pipes and valves to be described below. The treatment media 40 can also be of any other material which coacts with the influent, rather than filters the influent. The media particles 40, which may include beads, are preferably larger in diameter than the mesh of the screens 26 and 32, but this is not a necessity with certain types of media, especially powder-type of non-bonded media. The media beads 40 can be injected or removed from the media chamber 38 by way of a media access channel 44 located in the top end cap 14 or a media access channel 42 located in the bottom end cap 14. During the media coacting or filter cycle, the media beads 40 are located in the bottom of the fluid treatment and media management device 10. During a fluidization cycle, the media beads 40 are lifted to the upper portion of the media chamber 38 for removal of particulate matter therefrom.

In this embodiment, the inner perforated cylinder 32 has a plug 46 located centrally therein to prevent fluid flow through the central core of the inner perforated cylinder 32. Located below the plug 46 inside the inner perforated cylinder 32 are a number of orifice plates, one shown as reference character 48, to allow a controlled flow of fluid inside the inner perforated cylinder 32. The orifice size within each orifice plate 48 is smaller in diameter than that of the orifice located below it. The orifices function to optimize the sequential fluidization of the media beads 40. When a sufficient pressure is available to the backwash fluid, the media 40 can be fluidized without the use of the orifice plates 48. The bottom end cap 14 includes a funnel-shaped surface formed at the bottom of the media chamber 38. This upwardly slanted surface facilitates fluidization of all of the media beads 40. Reference is made to U.S. Pat. No. 6,322,704 by Martin for a further description of the fluidization process in a radial flow fluidizable filter. The disclosure of such patent is incorporated herein by reference.

The orifices described above in conjunction with the orifice plates can be formed in the orifice plates with all of the same size, and in different patterns. As an alternative to the use of orifice plates, a single ball suspended by a spring can be used. The upper end of the spring would be fastened to the underside of the plug 46. The ball would be a little smaller than the inside diameter of the inner perforated cylinder 32. As the fluidizing fluid exerts a lifting force on the ball, it would rise in the inner perforated cylinder 32 and allow fluidization of the media in much the same manner as the use of orifice plates.

Located above the plug 46 near the top of the inner perforated cylinder 32 is a ball and seat valve 50. The ball is captured by a screen cage fastened to the upper surface of the seat plate of the valve 50. The cage prevents the ball from being carried away with the backwash fluid. The cage can be constructed of other structures to contain the ball, such as a rod inserted laterally through the tubular inner perforated cylinder 32.

The upper end of the inner perforated cylinder 32 opens into a central port 52 formed within the top end cap 12. In like manner, the bottom end of the inner perforated cylinder 32 opens into a central port 54 formed in the bottom end cap 14.

Formed in the top and bottom end caps 12 and 14 are respective annulus ports 56 and 58. The top annulus port 56 opens into an annular recess 60 formed in the top end cap 12. Similarly, the bottom annulus port 58 opens into an annular recess 62 formed in the bottom end cap 14. The annular recesses 60 and 62 are in fluid communication with an annular area 64 located between the outer surface of the outer perforated cylinder 22 and the inside surface of the case 16.

Just subsequent to the backwash cycle and prior to the filter cycle described below in connection with FIG. 2, a short "purge" cycle can be initiated to quickly return the media beads 40 to the bottom of the media chamber 38 and purge the outer screen 26 (lining the inside of the outer perforated cylinder 22) of accumulated residue filtered from the influent. The purge cycle is initiated by briefly closing valve 51, closing the valve at the bottom central port 54, opening the valve at the bottom annulus port 58, and forcing the influent (or other purging liquid) downwardly into the inner perforated cylinder 32. The downward flow of the purging liquid is in the direction of arrows 53, which is effective to force the media 40 from the top of the media chamber 38 to the bottom of such chamber 38. Once the media 40 begins to settle to the bottom of the media chamber 38, the residue that may have accumulated on the outer screen 26 during the previous filter cycle is dislodged and flushed out through the bottom annulus port 58 to a drain.

As the media beads 40 become compacted, starting at the bottom of the media chamber 38 and becoming compacted upwardly, the accumulated matter or residue is also dislodged from the outer screen 26 in an upward manner. This occurs one row of horizontal perforations at a time from the bottom to the top as the media 40 contacts the bottom and accumulates in the bottom media chamber 38 from the bottom up. The downward fluid flow from the top down is continually forced radially outward as it comes into contact with the top of the media layer which is constantly changing as the media accumulates and fills the media chamber 38 from the bottom up. This concentration of flow at each row of perforations maximizes the mass and velocity of the flow impacting the outer screen 26 at any give time. This is in contrast to contacting the entire screen and annular space at the same time, which drastically reduces the amount of flow per unit area and thus the velocity and the mass and therefore impact per unit area of the screen. This is the typically operation with other filters, except in the cases where mechanical devices are employed, which are quite expensive. Once the outer screen 26 is purged of the residue, the valve at the bottom annulus port 58 is closed, the valve at the bottom central port 54 is opened, and the valve 51 at the top annulus port 56 is opened. This completes the purge cycle, which may take on the order of a few seconds. A steady or pulsed pressurized air burst can be added to the purge liquid when required to enhance the purge cycle.

FIG. 2 illustrates the filter 10 during a filter cycle where particulate matter is removed from the influent. The influent is coupled via external piping and valve arrangements to the top central port 52 as well as to the top annulus port 56. The influent is forced downwardly (shown by arrows 53) into the top of the media chamber 38 to push the media 40 downwardly to the bottom of the chamber 38. In addition, any influent that passes through the annular column of media particles 40 is effectively filtered. A majority of the influent passes into the top annulus port 56 and around the annular area 64 and through the bottom openings in the outer perforated cylinder 22. This influent passes radially through the media 40 and is filtered. The filtered influent passes radially through the large outer surface area media 40 and through the openings in the inner perforated cylinder 32 and downwardly in the core of the inner perforated cylinder 32 to the bottom central port 54. In this configuration, the media access channels 44 and 42 are capped or otherwise valved to a closed position. The bottom annulus port 58 is also capped or valved to a closed position.

With the construction of the top and bottom end caps 12 and 14, a media exchange cycle is made possible. In filter or media coaction systems, the media often needs to be replaced or regenerated. Usually, this requires the disassembly of the filter or removal of the filter from the system. In the present filter, all that needs to be done is the use of a media exchange cycle, where the spent media is removed from the device 10 via the media access channels 42 or 44. Preferably, the media 40 can be removed via the top media access channel 44 during a fluidizing cycle. Conventional valves (not shown) can be used to automatically or manually control the opening and closing of the media access channels 42 and 44. The spent media 40 can then be disposed of or otherwise regenerated. The regenerated media, or a new or different media can then be injected into the fluid treatment and media management device 10 via one or both media access channels 42 or 44. The media 40 that may be used includes traditional beads for filtering particulate matter, activated carbon media, ion exchange media, or many other types of media Accordingly, if a different fluid is to be processed through the fluid treatment and media management device 10 of the invention, it is simple matter to equip the device with the appropriate media without any disassembly thereof. The filter process continues until the media 40 has accumulated particulate matter to the extent that the pressure in forcing the influent into the fluid treatment and media management device 10 increases above a predefined threshold. In this event, a backwash cycle can be instituted.

Figure 3:
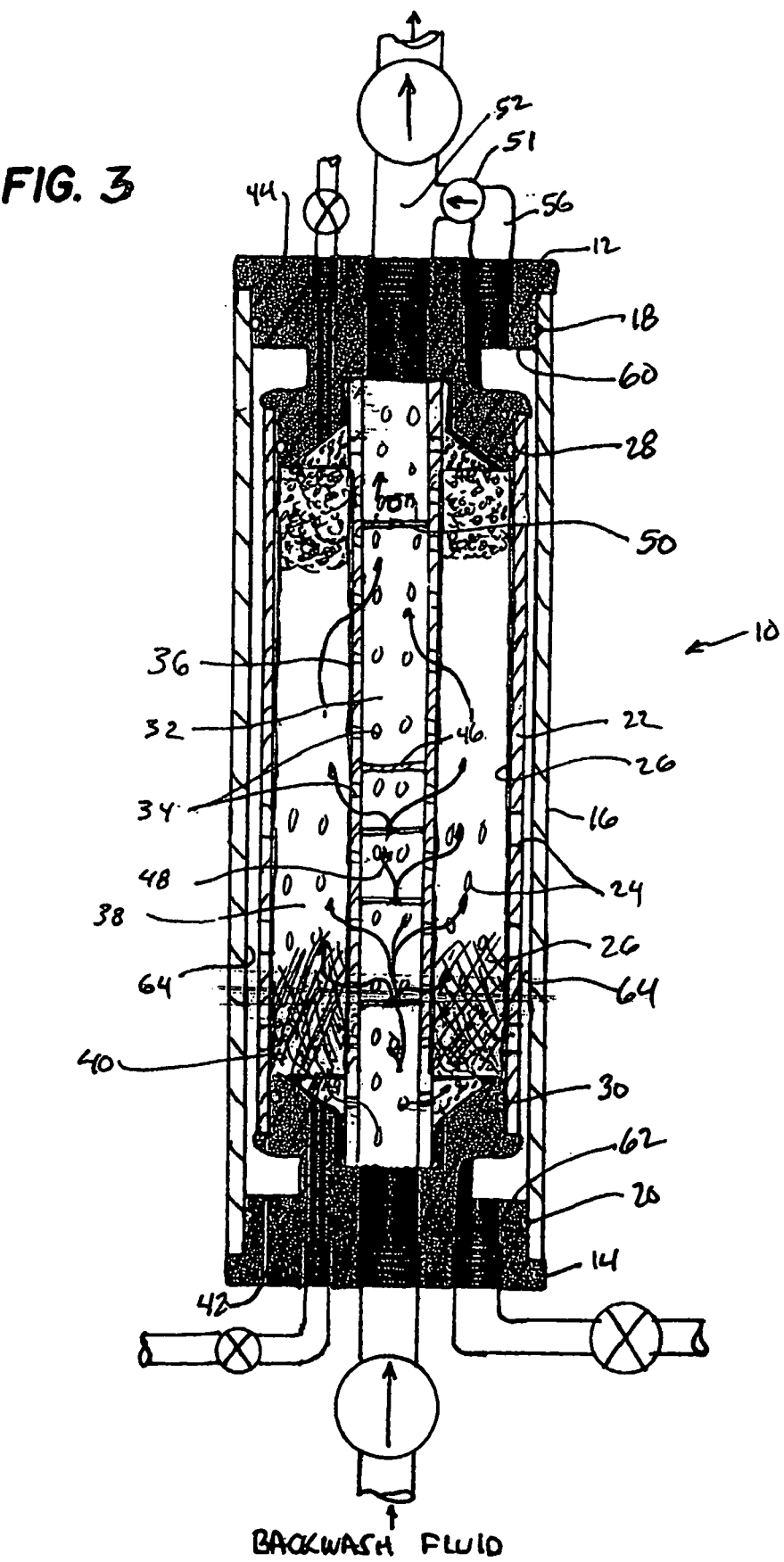
FIG. 3 illustrates the fluid processing system of FIG. 1b, in a media regeneration cycle.

The backwash cycle of the fluid treatment and media management device 10 is shown in FIG. 3. Here, the external valving arrangement is switched so that the backwash fluid enters the fluid treatment and media management device 10 via the bottom central port 54. The backwash fluid is forced into the central core of the inner perforated cylinder 32. The backwash fluid is forced to flow through the orifices in the plates 48 and outwardly through the openings 34 in the inner perforated cylinder 32. Reference is made to U.S. Pat. No. 6,322,704 for the structure of the orifice plates 48 in the core of the inner perforated cylinder 32 that optimizes sequential fluidization of the media 40. In any event, the backwash fluid fluidizes the media 40 in vertical sections and separates the particulate matter therefrom. During fluidizing, the media 40 is raised to the upper end of the media chamber 38. When raised upwardly, the media particles 40 are separated and cleaned. The backwash fluid and the particulate matter are carried upwardly back into the inner core of the upper half of the inner perforated cylinder 32 and out of the upper most ball/seat valve 50. This is shown by the arrows. The backwash fluid and particulate matter are carried out of the top central port 52. The top annulus port 56 may be valved to a closed position, as shown, or may be open to purge the annular area 64 of any entrapped solids. This port 56 may be open intermittently or continuously throughout the backwash cycle. It should be noted that pressurized air can be used in the backwash cycle to facilitate fluidizing and cleaning of the media 40.

Figure 4A:
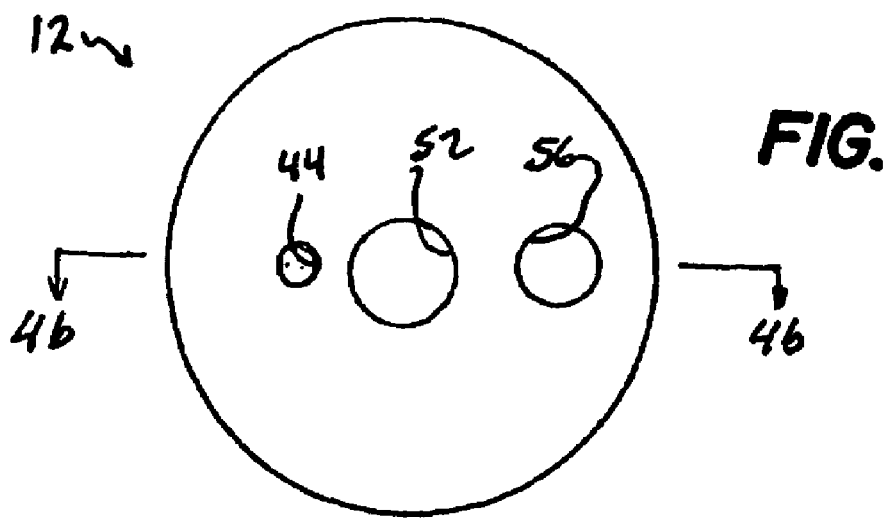
FIGS. 4a-4c illustrate respective top, cross-sectional and bottom views of one end cap employed in the embodiment of FIG. 1b.
Figure 4B:
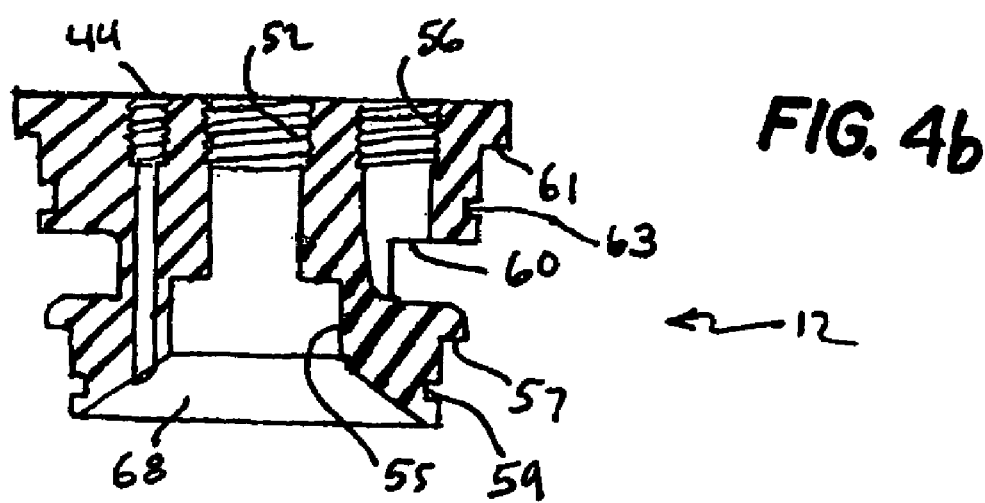
Figure 4C:
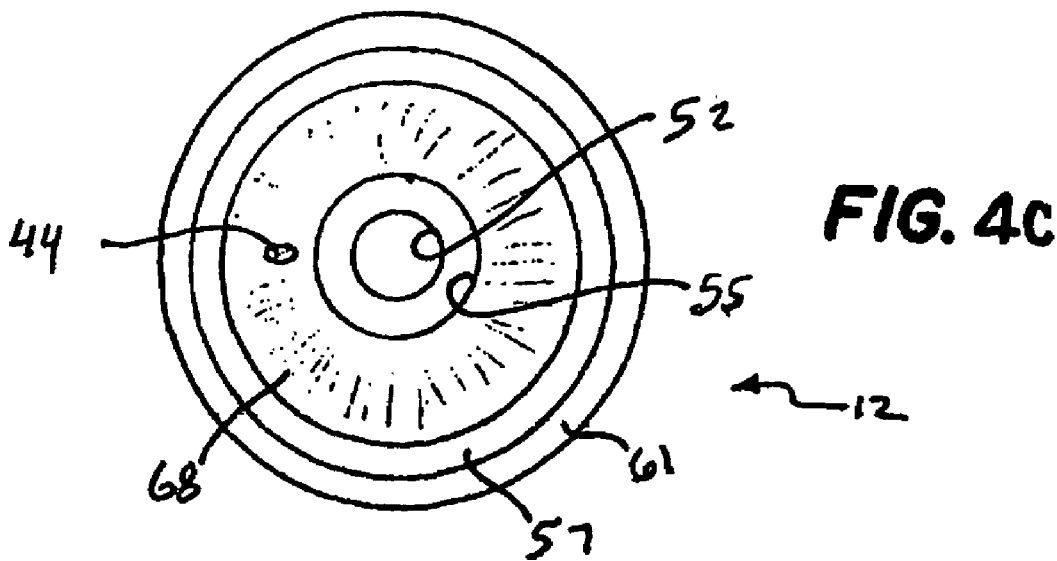

FIGS. 4a-4c illustrate the details of the top end cap 12 according to the invention. FIG. 4a illustrates the location of the various top ports formed in the top end cap 12. The various ports can be formed in other locations. While the top end cap 12 and the bottom end cap 14 are shown with a single media access channels 44 and 42, such end caps can be constructed with multiple media access channels to facilitate the inlet and outlet of the media 40 with respect to the device 10. In order to allow uniform distribution of the media 40 around the media chamber 38, two oppositely-located inlet media access channels 44 can be formed in the top end cap 12. Similarly, for complete removal of the media 40 from the media chamber 38 during regeneration thereof, two oppositely-located outlet media access channels 44 can be formed in the bottom end cap 14. As yet another alternative to the end cap design, the top end cap 12 can be constructed with one or more media access channels opening to an annular groove (not shown) which function to uniformly distribute the media 40 around the annular-shaped media chamber 38. The bottom end cap 14 can be formed with a similar structure to assure that the media 40 can be completely removed from the media chamber 38 during the external media regeneration cycle. As will be described more fully below, the media 40 can be removed from the device 10 by a fluidization process, and coupled to a regeneration container for either removing the filtered particulate matter from the media 40, or for regenerating the media 40 chemically or otherwise to reconstitute it to its pristine state. It is noted that the top media access channel 44 opens into a frustroconical-shaped surface 68 of the top end cap 12. This frustroconical surface 68 is especially important in the bottom end cap 14 to assure that substantially all of the media 40 can be removed from the media chamber 38 for regeneration of the media 40 by an external regeneration system or equipment.

The top end cap 12 is molded with a central bore 55 for receiving therein the inner perforated cylinder 32. The inner perforated cylinder 32 can be formed with an annular grove therearound for holding an O-ring to seal the inner perforated cylinder 32 to the central bore 55 of the end cap 12. The central bore 55 opens into the frustroconical surface 68. The end cap 12 is formed with an annular edge 57 against which the annular edge of the outer perforated cylinder 22 can abut. A groove 59 is formed in the end cap 12 for receiving therein an O-ring 28 for sealing the outer perforated cylinder 22 to the end cap 12. Formed in the top end cap 12 is another annular edge 61 against which the case 16 can abut. A groove 63 is formed around the top end cap 12 for receiving therein an O-ring 18 to seal the case 16 to the top end cap 12. As noted in FIG. 4b, the top annulus port 56 opens into an annular recess 60 so that the influent can be distributed around the annular area 64 between the case 16 and the outer perforated cylinder 22. The ports 52 and 56 and the media access channel 44 are threaded for allowing pipes, valves or other plumbing apparatus to be connected to the end caps 12 and 14. Alternatively, the threaded connections can be formed for allowing plumbing apparatus to be bonded to the ports and channels. Those skilled in the art may also prefer to provide quick-connect type of connections to the end caps 12 and 14.

Figure 5:
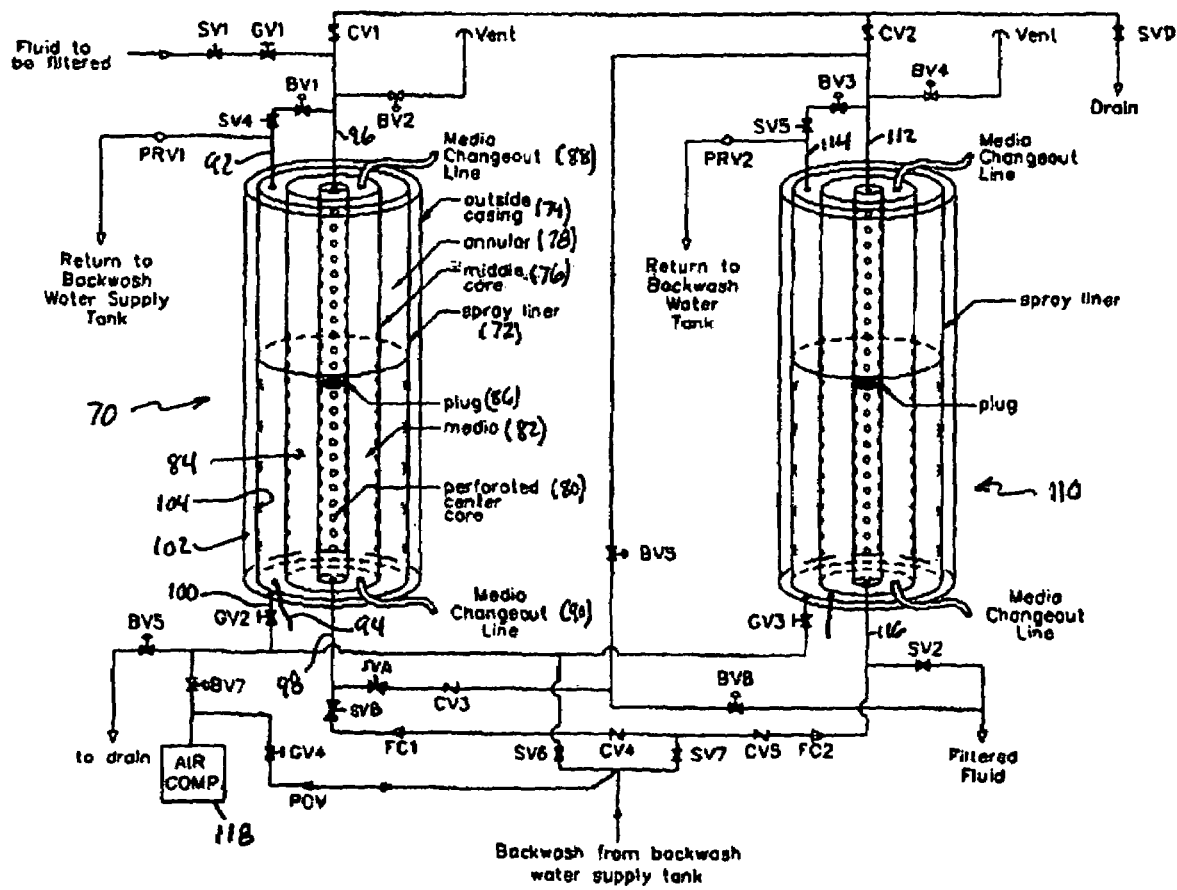
FIG. 5 illustrates in schematic diagram form plural fluid processing systems arranged in series.

FIG. 5 is a drawing of another embodiment of a set of radial flow fluid treatment and media management devices 70 and 110 connected in a series relationship. In this embodiment, the fluid treatment and media management device 70 includes a spray liner 72 located between a case 74 and an outer perforated cylinder 76. The outer perforated cylinder 76 is constructed with large perforations on the bottom half thereof. Between the outer perforated cylinder 76 and the spray liner 72 is an annulus 78. Located in the axial center of the fluid treatment and media management device 70 is an inner perforated cylinder 80. The inner perforated cylinder 80 has large perforations along the entire length thereof. A plug 86 is attached about midway in the internal core of the inner perforated cylinder 80 to prevent fluid flow directly between the upper portion of the inner perforated cylinder 80 and the lower portion thereof. An outer screen (not shown) is attached to the inner surface of the outer perforated cylinder 76, and a smaller-diameter inner screen (not shown) is attached to the outer surface of the inner perforated cylinder 80. Both screens have a mesh size that is smaller than the size of the media beads 82 located in the annular media chamber 84 between such screens. The media beads 82 preferably fill the annular column 84 about half way, and above the plug 86.

A top end cap is made with a media access channel 88 in the top of the fluid treatment and media management device 70 in communication with the annular column 84. A bottom end cap is similarly made with a media access channel 90 in the bottom of the annular column 84. Media beads 82 can be input and removed via such media access channels 88 and 90. The top end cap is also constructed with an inlet port 92 in communication with the annular 78 between the outer perforated cylinder 76 and the spray liner 72. In like manner, the bottom end cap is constructed with a port 94 in communication with the bottom of the annular 78. As will be described below, the ports 92 and 94 can be used to remove from the fluid treatment and media management device 70 residue that becomes caked on the outer surface of the outer screen covering the outer perforated cylinder 76. The top and bottom end caps are constructed with a respective top central port 96 and a bottom central port 98. Lastly, the bottom end cap is constructed with a port 100 connected to the annular space 102 between the case 74 and the spray liner 72. The top end cap 12 can also be constructed with a similar port connected to the annular space 102.

The spray liner 72 is constructed using a rigid cylindrical tube, such as a PVC pipe or other suitable material, with nozzle holes formed therein. The nozzle holes may be drilled holes or other nozzle structures, one shown as reference numeral 104. The nozzle holes are of such a size that a spray stream is formed and directed to the outer screen attached to the outer perforated cylinder 76. Of course, the size of the nozzle holes 104 are a function of the pressure of the liquid injected into the annular space port 100. In addition, the nozzle holes 104 are formed uniformly around the spray liner 72, but only in the bottom half thereof corresponding to the locations of the outer screen areas exposed by the perforations formed in the outer perforated cylinder 76. In other embodiments where the perforations in the outer perforated cylinder 76 extend to the top thereof, then the nozzle holes 104 would also be formed in the upper portion of the spray liner 72.

The other series-connected fluid treatment and media management device 110 is constructed in a manner substantially identical to the fluid treatment and media management device 70 described above. The two devices 70 and 110 are connected together by a system of valves, check valves and other apparatus to control the flow of influent through the devices 70 and 110 in series. To that end, the media beads in the downstream device 110 can be smaller and thereby filter smaller-size particulate matter from the influent processed by the first device 70.

In a filter cycle, an influent is input to the first fluid treatment and media management device 70 via solenoid valve SV1 and gate valve GV1. The influent is directed to the top central port 96 as well as to the annular port 92 via the ball valve BV1 and solenoid valve SV4. The filtering of the influent is carried out very much like the embodiment described above in connection with FIGS. 1-3. The filtered effluent is carried out of the bottom central port 98 of the first fluid treatment and media management device 70 to the top central port 112 of the second fluid treatment and media management device 110 via valves SVA, CV3 and BV5, and to the annular port 114 via valves BV3 and SV5. The influent carried to the second fluid treatment and media management device 110 is filtered and carried away as filtered fluid via the central outlet port 116 to a reservoir or other treatment equipment via valve SV2. Accordingly, the influent passes serially through the first fluid treatment and media management device 70, and then through the second fluid treatment and media management device 110. As can be appreciated, after a period of filtering the influent, particulate matter tends to clog the spaces between the media beads 82, and larger particulate matter becomes caked on the outer surface of the screen attached to the inner surface of the outer perforated cylinder 76. The fluidizing of the media beads 82 is effective to remove the particulate matter clogging the spaces between the media beads 82, but is not substantially effective in removing the caked particulate matter on the outer screen covering the outer perforated cylinder 76.

Prior to of after the fluidizing cycle, a spray cycle can be carried out to overcome the problem of caked residue on the outer screen covering the outer perforated cylinder 76, or removing particulate matter lodged between the outer screen and the media 40. In a spray cycle, a pressurized fluid is injected into the lower port 100 and thus pressurizes the annular space 102. Preferably, although not by way of necessity, the annular space 78 is drained so as to be empty of fluid before the pressurizing spray cycle begins. However, it is envisioned that it would be effective even if the annular space 78 has a liquid therein. In any event, a spray fluid, such as water or air, or any suitable solvent, is pumped from a spray supply tank through valves SV6 and GV2 into the bottom port 100 coupled to the annular space 102. The annular space 102 is thus pressurized, whereupon a high pressure stream is directed through the nozzles 104 of the spray liner 72 and onto the outer screen covering the outer perforated cylinder 76. The high pressure spray streams are effective to dislodge and remove the caked particulate matter from the outer screen. The caked particulate matter is removed from the fluid treatment and media management device 70 by way of the bottom port 94 through a valve, not shown. Alternatively, or in addition, the dislodged particulate matter can be removed from the fluid treatment and media management device 70 via the top port 92 and the valve PRV1. It is anticipated that the fluid treatment and media management devices 70 and 10 would undergo spray cycles one at a time, to make more effective the pressurized fluid in one device, rather than sharing the pressurized fluid at the same time between the series-connected fluid treatment and media management devices 70 and 110.

In addition to the use of high pressure spray streams to dislodge the caked particulate matter on the outer screen covering the outer perforated cylinder 76, air pressure can also be injected into the spray streams. The injection of steam or other fluid is also an alternative. A source of air pressure 118 is connected to the bottom port 100 of the fluid treatment and media management device 70 by way of valves BV7 and GV2. The air can be injected into the high pressure liquid stream to create turbulent fluid flow and thereby more effectively dislodge the caked particulate matter from the screen. Air pressure can also be coupled to the annular space port of the second fluid treatment and media management device 110 by way of valves BV7 and GV3.

The fluidization of the media beads 82 can be carried out after the spray cycle. It is envisioned that there may not need to be a fluidization cycle for every spray cycle. Rather, the fluid treatment and media management device can undergo a fluidization cycle after multiple spray cycles. In a fluidizing cycle, or backwash cycle, the backwash fluid is obtained from a backwash supply tank. The backwash fluid is directed to the bottom central port 98 of fluid treatment and media management device 70 via valves SV7, CV4, FC1 and SVB. The media beads 82 are fluidized in the manner described above, whereupon the particulate matter is carried away with the backwash liquid via top central port 96 and valves CV1 and SVD to the drain. In addition, the backwash fluid and particulate matter are carried away via the top annular port 92, via valves SV4, BV1, CV1 and SVD to the drain. At the same time the first fluid treatment and media management device 70 is backwashed, the second fluid treatment and media management device 110 can also undergo a backwash cycle. The backwash liquid is directed through SV7, CV5 and FC2 to the bottom central port 116 of the second fluid treatment and media management device 110. The backwash fluid and particulate matter exit the top ports 112 and 114 of the second fluid treatment and media management device 110, and are carried to the drain via the valves CV2 and SVD (from top central port 112) and valves SV5, BV3, CV2 and SVD (from top annular port 114).

Figure 6:
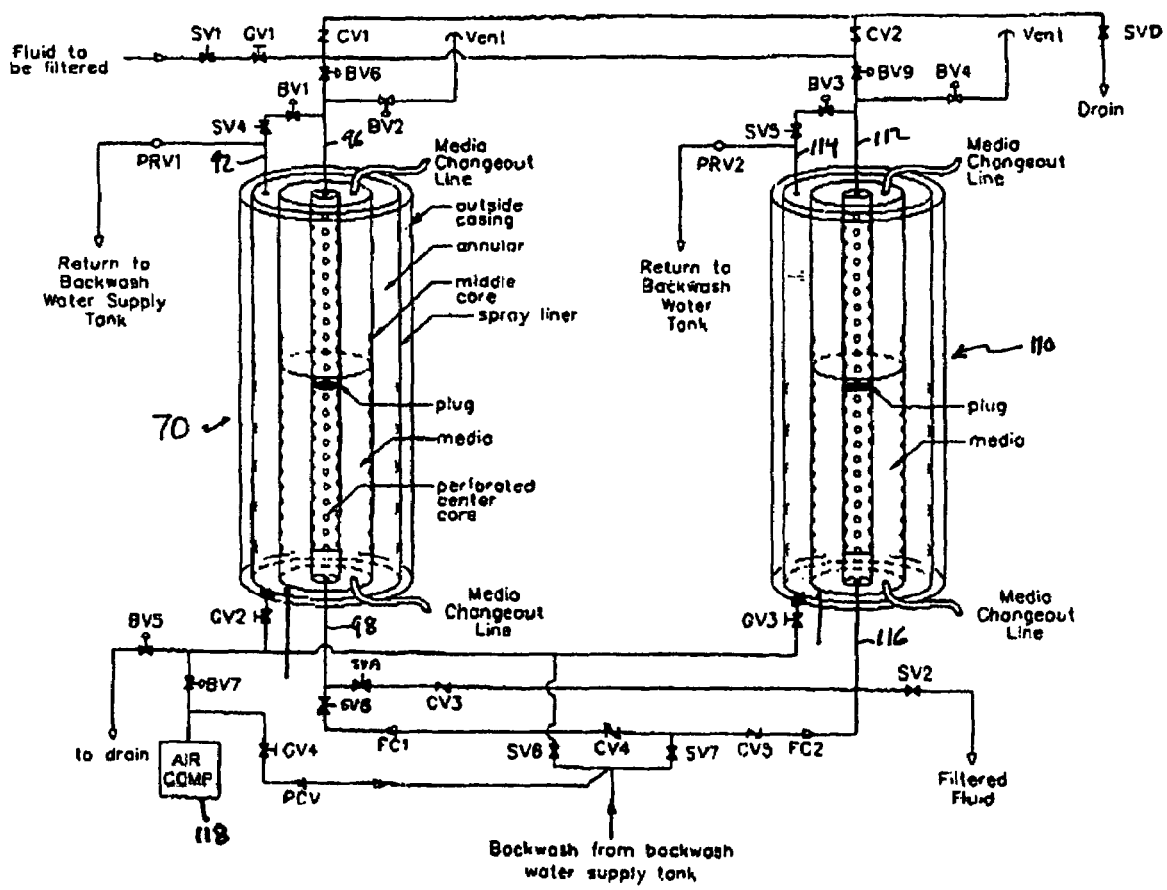
FIG. 6 illustrates in schematic diagram form plural fluid processing systems arranged in parallel.

FIG. 6 illustrates another embodiment in which the fluid treatment and media management devices 70 and 110 are connected in parallel. The fluid treatment and media management devices 70 and 110 otherwise function in the same manner as described above in connection with the FIG. 5 embodiment. The influent is coupled to the first fluid treatment and media management device 70 and the second fluid treatment and media management device 110 in parallel. The influent is carried to the first fluid treatment and media management device 70 via the top central port 96 through valves SV1, GV1 and BV6, and to the annular port 92 via additional valves BV1 and SV4. The influent is also carried from valve GV1 to valves CV1, CV2 and BV9 to the central port 112 of the second fluid treatment and media management device 110, as well as through valves BV3 and SV5 to the annular port 114 of the second fluid treatment and media management device 110.

The filtered fluid is carried out of the bottom central port 98 of the first fluid treatment and media management device 70 to the filtered fluid pipe or reservoir, via valves SVA, CV3 and SV2. The filtered fluid from the second fluid treatment and media management device 110 is carried from the bottom central port 116 to the filtered pipe or reservoir by valve SV2. As can be seen, the fluid treatment and media management devices 70 and 110 filter the influent in parallel, thereby increasing the treatment capacity of the system.

The spray and the backwash cycles are carried out with the parallel-connected fluid treatment and media management devices in much the same manner as described above with the embodiment of FIG. 5.

Figure 7:
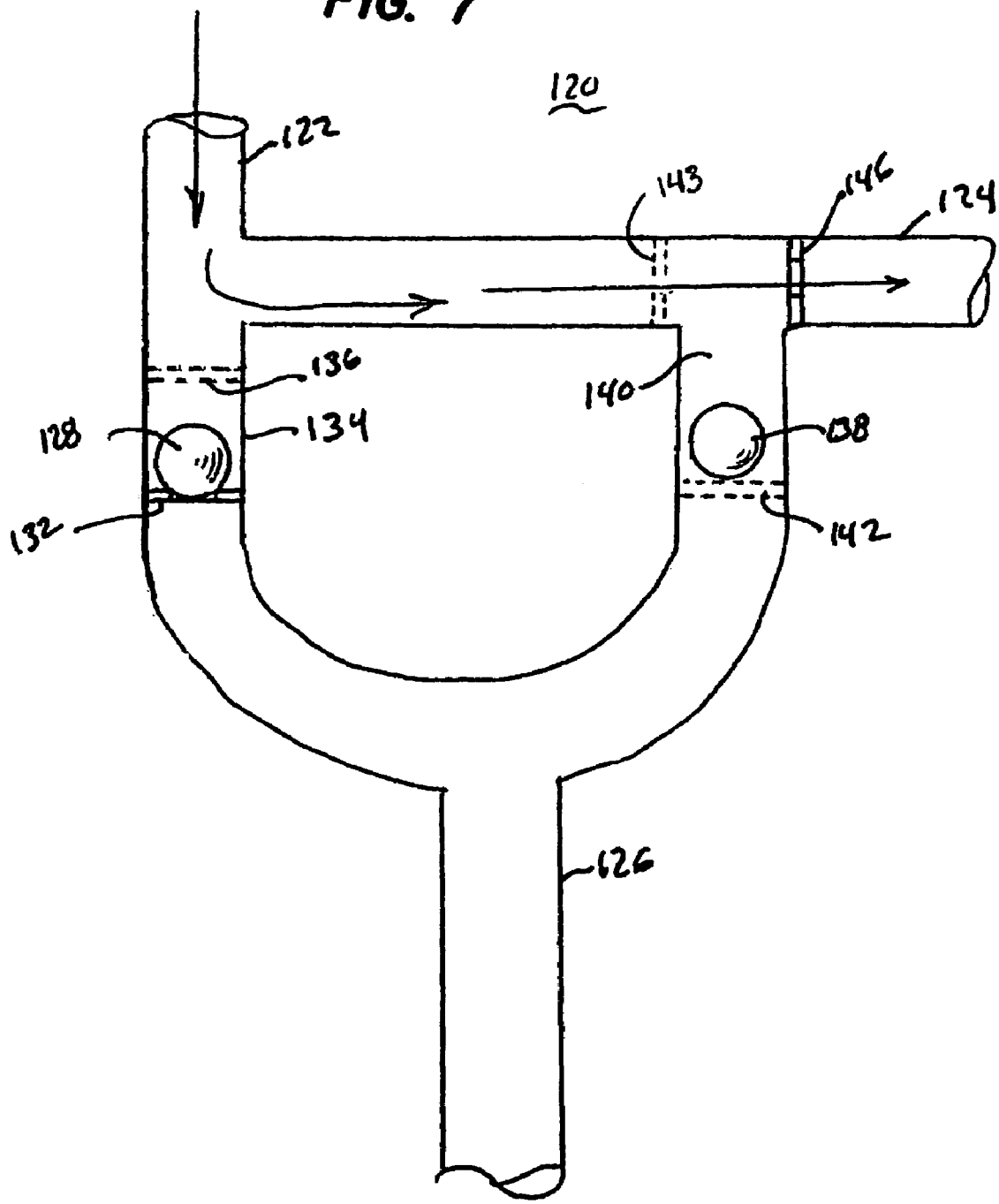
FIG. 7 illustrates a valve arrangement adapted for use with the present invention, with the valve balls in a position as would be during a filter cycle.
Figure 8:
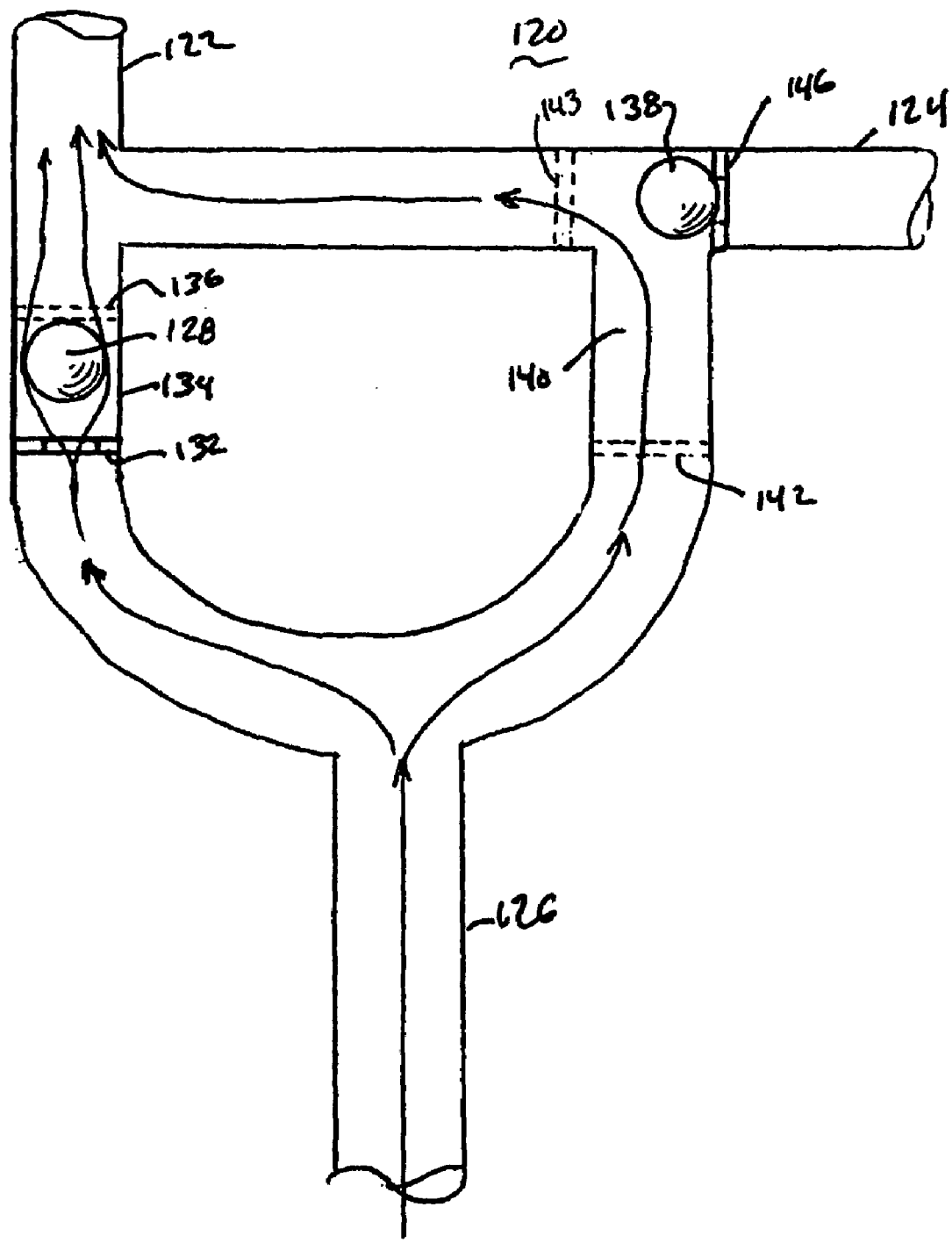
FIG. 8 illustrates the valve arrangement of FIG. 7, in a backwash cycle.

It is noted in FIGS. 5 and 6 that the system uses solenoid valves SVA and SVB to control routing of fluid during the filter cycle and the backwash cycle. While the use of solenoid valves is acceptable, such valves are expensive. As an alternative, FIGS. 7 and 8 illustrate the construction of a simple valve 120 that accomplishes the same purpose described above in connection with the solenoid valves SVA and SVB. FIG. 7 shows the state of valve operation during a filter cycle, and FIG. 8 shows the state of valve operation during a backwash cycle. Importantly, the valve 120 does not use any electrically controlled apparatus and has few parts. The valve 120 may be constructed of plastic, metal or any other suitable material. The valve 120 includes three ports 122, 124 and 126. Two balls 128 and 138 are located in specified areas of operation. The balls 128 and 138 are constructed of a solid material that is heavier than the fluid being processed through the valve 120. If water is the basic fluid being processed, then balls made of Teflon or an acrylic material can be used. The balls 128 and 138 can also be spring biased downwardly, rather than moved solely under the influence of gravity. The ball 128 can move down into engagement with a seat 132 and close off downward movement of fluid in valve section 134. The ball 128 can move upwardly and bump against a stop 136. The stop 136 simply prevents further upward movement of the ball 128, but does not interfere with fluid flow. The stop 136 can be a small-diameter rod fixed transverse within the section 134. The other ball 138 is constrained generally in the valve section 140 by a first stop 142, a second stop 143 and a seat 146.

If fluid is flowing upwardly with respect to ball 128, then the ball 128 will rise against the stop 136 and allow fluid to pass upwardly through the valve section 134 from port 126 to port 122. If fluid attempts to flow downwardly in valve section 134, then the ball 128 is forced downwardly into engagement with the seat 132 and prevents the downward flow of fluid. With regard to the ball 138, if fluid flows upwardly in valve section 140, then the ball 138 is carried with the fluid upwardly and is lodged in the seat 146, due to a pressure difference across the seat 146. Fluid is thus blocked from flowing to the port 124. Once fluid flow is stopped or otherwise momentarily interrupted through the valve 120, the ball 138 drops back onto the stop 142. Then, fluid flow from the valve port 122 to port 124 is possible.

As can be seen from FIGS. 5 and 7, in a filter cycle, the filtered effluent can flow from the bottom central port 98 of the filter 70 through valve port 122 to valve port 124, to inlet ports 112 and 114 of fluid treatment and media management device 110 (FIG. 5). The down line check valve CV4 prevents fluid flow downwardly through port 126 of the valve 120.

In FIG. 8, the backwash cycle is carried out through the valve 120 in the following manner. The upward flow of fluid from port 126 carries ball 128 upwardly against the stop 136, thus allowing fluid to flow upwardly to the top port 122. In addition, the upward flow of fluid carries the other ball 138 upwardly into engagement with the seat 146, thus preventing fluid flow into the valve port 124. Fluid from port 126 also flows through valve section 140 to the top port 122, as shown by the arrows. It can thus be seen that the valve 120 can be used instead of two solenoid actuated valves SVA and SVB of FIGS. 5 and 6. The valve 120 can be utilized in many other system applications.

It should be noted in the foregoing description that the fluid treatment and media management devices have been described in a down-flow configuration, where the influent flows downwardly through the devices during the filter cycle. In the down-flow configuration, the filter chamber is at the bottom of the fluid treatment and media management device, and the backwash chamber, if any, is at the top of the device. The fluid treatment and media management devices described above can also be used in an up-flow configuration where the influent flows upwardly through the fluid treatment and media management devices during the treatment cycle. In the up-flow configuration, and the filter chamber with the media bed is located at the top of the fluid treatment and media management device, and the backwash chamber is located at the bottom of the device.

Figure 9A:
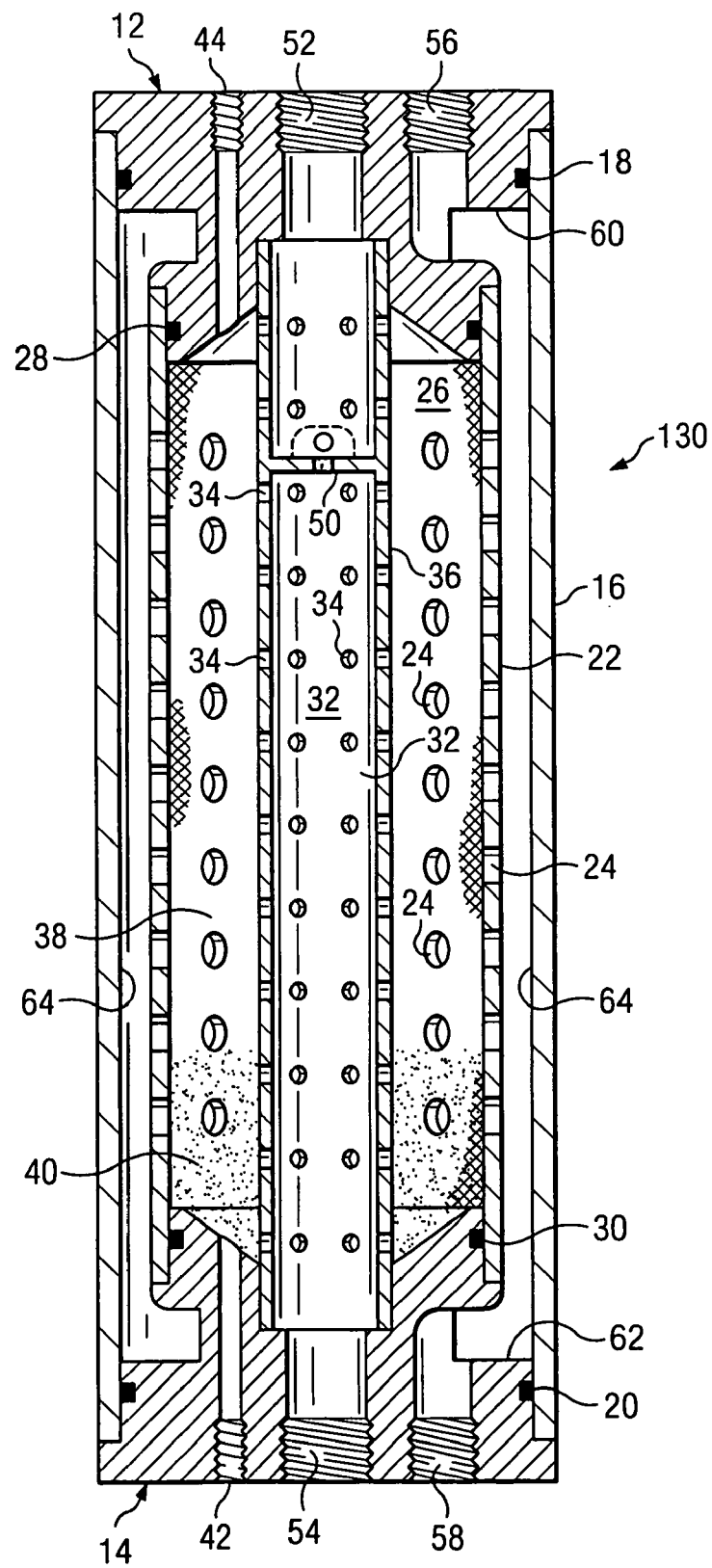
FIG. 9a illustrates a fluid treatment and media management device according to another embodiment.

FIG. 9a illustrates another embodiment of a fluid treatment and media management device 130. The fluid treatment and media management device 130 is constructed in a manner very similar to that described in connection with FIG. 1b, except that the device 130 includes a media chamber 38 that is substantially or fully filled with the media 40 from the bottom to the top thereof. To that end, the inner perforated cylinder 32 does not have a plug therein, or orifice plates, as does that of FIG. 1. In addition, the outer perforated cylinder 22 includes perforations 24 throughout the entire length thereof. The coaction of an influent with the media 40 occurs over a much larger surface area, as compared to that of the fluid treatment and media management device 10 of FIG. 1b. As can be appreciated, the fluid treatment and media management device 130 does not provide for internal fluidization of the media 40 to remove particulate matter therefrom. Rather, the fluid treatment and media management device 130 is adapted for removal of the media 40 and regeneration thereof in external equipment. After the media 40 is regenerated, it is transferred back to the fluid treatment and media management device 130, via one or both of the media access channels 42 and/or 44.

The media 40 can be injected into the media chamber 38 either by way of media access channel 44 located in the top end cap 12, or the media access channel 42 located in the bottom end cap 14. In the preferred embodiment, the media 40 fills the media chamber 38. The top end cap 12 and the bottom end cap 14 are constructed in a manner substantially the same as that described in connection with FIGS. 1-4.

In operation of the fluid treatment and media management device 130, media 40 of the desired type is coupled to the media access channel 44 via an external piping and valve arrangement. The valve at the media access channel 42 is moved to a closed position. The media 40 is preferably coupled to the device 130 in a liquified form (slurry) so that it fills the media chamber 38, preferably above the plate 50. If the media 40 does not fill the media chamber 38 above the plate 50, then the influent could be short circuited from the top annulus port 56 directly to the central core of the inner perforated cylinder 32, without being filtered. Other valves may be opened to provide a vent to facilitate the liquified flow of the media 40 into the media chamber 38. Once the media chamber 38 is filled with the media 40, the top media access channel 44 and the bottom media access channel 42 are valved to closed conditions.

During an optional intermediate cycle, called a purge cycle, the media 40 is packed or otherwise caused to settle down in the media chamber 38. During this cycle, a liquid is input into the central inlet port 52, and the bottom annulus port 58 is briefly opened to relieve the internal pressure of the device 130. This action allows the liquid to force the media 40 downwardly in the media chamber 38 into a concentrated or packed condition. If needed, additional media 40 can be input into the media chamber 38 as a result of the purge cycle.

During a influent treatment cycle, either undesired particulate matter is removed from the influent, or the influent is coacted with the material of the media 40. The influent is coupled via external piping and valve arrangement to the top annulus port 56 and or the bottom annulus port 58. The influent is thus coupled to the annular chamber 64 that encircles the entire length of the outer perforated cylinder 22. The influent is forced in a radial direction through the media 40 located in the media chamber 38. The influent that passes through the media particles 40 is effectively treated. The filtered influent passes radially through the media 40 and through the openings in the inner perforated cylinder 34 and downwardly in the core thereof to the central outlet port 54. From the central outlet port 54, the treated liquid, i.e., effluent, is carried externally from the system to other equipment for further processing, or to terminal equipment.

The filter process continues until the media 40 has accumulated particulate matter to the extent that the pressure in forcing the influent into the device 10 increases above a predefined threshold. When the device is used for coacting the influent with the media 40, the coacting cycle continues until there is an indication that the media 40 is no longer effective in removing or adding the desired substance with respect to the influent. In this event, a regeneration procedure or cycle can be instituted.

Figure 9B:
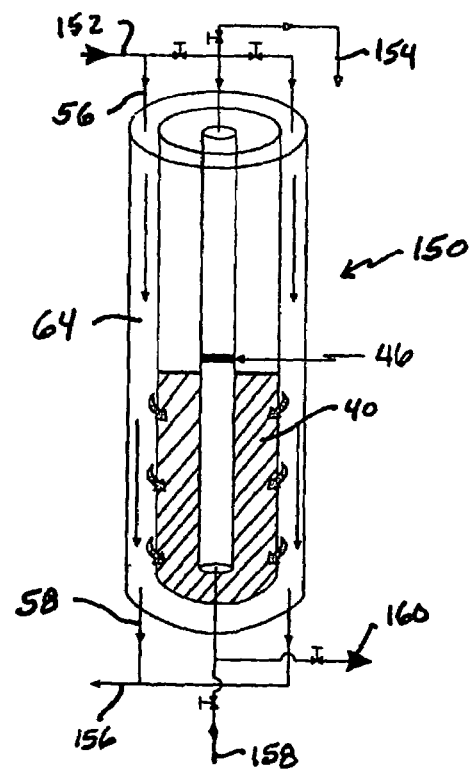
FIG. 9b illustrates in simplified form a cross-flow fluid treatment and media management device of the invention.

The device 130 of FIG. 9a can also function as a cross-flow device 150 shown in simplified form in FIG. 9b. In a cross-flow device 150, not all of the influent passes through the media 40. Rather, the more particle-laden influent bypasses the media 40 and is carried to a clarifier or other settling vessel. The cross-flow device 150 can be situated in a system in which the influent is input into the annulus input 56 and is carried into the annular volume 64. Most of the less particle-laden influent is carried radially through the media 40, while the heavier and larger particles are carried downwardly in the annular volume 64 and swept out of the lower annulus port 58 to be transferred to a clarifier or feed water. This prevents the media 40 from being prematurely clogged with particulate matter. It is believed that the velocity vectors characteristic of the influent are not sufficiently strong in the radial direction (with respect to the larger particles), and thus the large particles bypass the filter media 40.

The cross-flow device 150 includes a connection 152 connected to a clarifier or feed water supply. A line 154 is connected to a backwash drain. Line 156 is connected to a return input to the clarifier, or source of feed water. Line 158 is connected to a supply of backwash liquid. Lastly, line 160 is an outlet connection for treated fluid from the cross-flow device 150. The other functions of the cross-flow device 150 otherwise operate in the manner described above in connection with the fluid treatment and media management device 130 of FIG. 9a.

Figure 10:
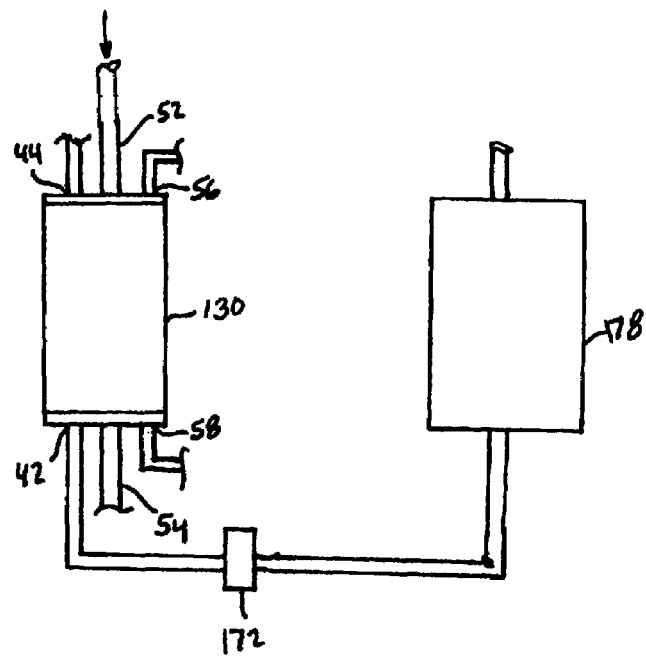
FIG. 10 illustrates a fluid treatment and media management device of FIG. 9a with a media regeneration system.

A system incorporating the fluid treatment and media management device 130 is illustrated in FIG. 10. The regeneration cycle is shown. The system includes a valve 172 controlling the outlet media access channel 42 of the device 130, and a pump (not shown) suited for pumping a liquid into the top central port 52 of the device 130. A container 178 is illustrated of the type adapted for removing particulate matter from the media 40, or otherwise regenerating the media 40 to reconstitute it to its pristine condition. The external valving arrangement is switched so that a transfer liquid enters the device 130 via the top central port 52. The transfer liquid can be of any type suitable to form a slurry with the media 40. The transfer liquid is forced into the central core of the inner perforated cylinder 32. The ball in plate 50 forced closed in its seat by the pressure of the transfer liquid. The transfer liquid is thus forced outwardly through the perforations 34 in the top portion of inner perforated cylinder 32, and into the top of the column of media 40. This applies a downward force on the column of media 40. At the same time, the transfer liquid is forced outwardly at the top of the media chamber 38 and into the annular area 64, to the bottom thereof. The transfer liquid in the annular area 64 reenters the media chamber 38 at the bottom thereof and tends to liquify the media 40 and flush it down the media access channel 42, through the open valve 172 and to the container 178. Once the media 40 begins to fluidize and is carried out the outlet media access channel 42, there is an avalanche effect that results in the quick and efficient removal of the media 40 from the device 130.

Alternatively, the top ball in plate 50 can be eliminated, whereupon and the media 40 itself at the bottom of the media chamber 38 would provide a resistance to the flow in the outside annular to prevent the transfer liquid from short circuiting and therefore force the liquid and the media 40 out the outlet media access channel 42.

The media 40 is regenerated by conventional means in the container 178 or with other media regeneration equipment. In the event the media 40 are beads, the container 178 can be equipped with apparatus so that a liquid is forced into the bottom of the container 178 with sufficient velocity that the axial drag forces overcome the buoyant weight of the media beads, whereupon fluidization occurs and the particulate matter is separated from the media 40 and carried out of the top of the container 178. For other types of media, chemicals, heat and other materials can be used to regenerate the media 40. This is particularly advantageous where additional lifting forces are required to fluidize the media 40, where heavy, large, angular, etc., media may be used. The container 178 provides total axial flow of the cleansing liquid, which would not otherwise be efficient in a radial flow fluid treatment and media management device where perforated cylinders are employed. The use of an external regeneration container 178 thus maximizes the drag forces and therefore the lifting capacity on the media 40 in the axial or vertical direction.

In accordance with an important feature of the invention, much less liquid is required during the media regeneration cycle, as compared to prior art systems. In other applications, the container 178 may be physically located below the device 130, in which event the media 40 can be allowed to be fluidized with a transfer liquid or influent by the action of gravity, and carried to the container 178 where it is regenerated.

Figure 11:
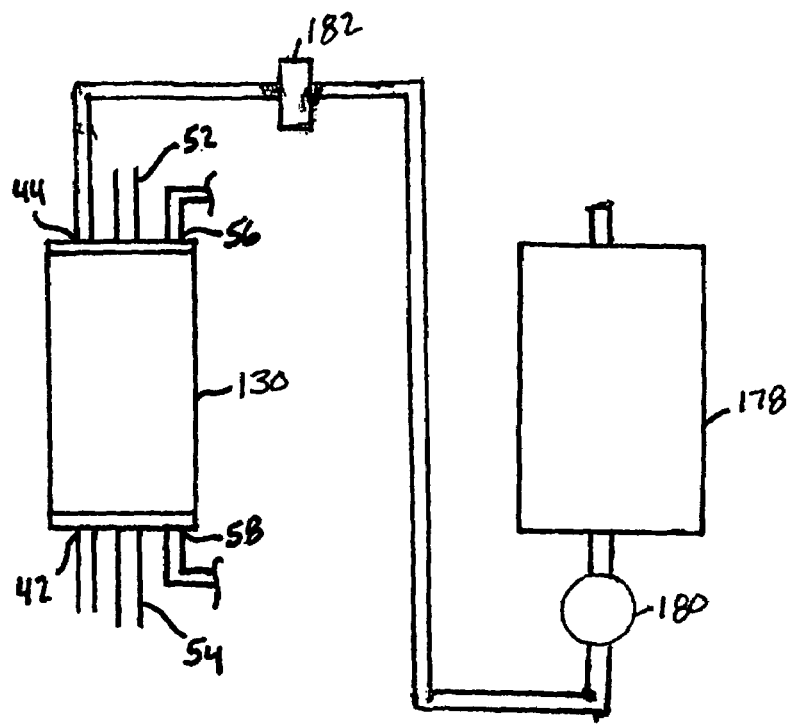
FIG. 11 illustrates the configuration of the media regeneration system of FIG. 10 during a latter portion of the regeneration cycle where the media is carried back to the fluid processing device.

FIG. 11 illustrates the system in a state in which the regenerated media 40 is transferred back to the fluid treatment and media management device 130. After the media 40 has been regenerated in the container 178, it is pumped by a pump 180 in slurry form through the open valve 182 to the inlet media access channel 44 of the device 130. The slurry of media 40 is carried into the media chamber 38 of the device 130 and fills it from the bottom to the top thereof. The outlet media access channel 42 of the device 130 can be vented to relieve internal pressure during the media refilling cycle and expedite filling of the media chamber 38 with the regenerated media 40.

In other systems, one or more containers 178 can be utilized for regenerating the media 40. One container 178 can be employed to regenerate the media 40 and hold the regenerated media 40 until needed. While the fluid treatment and media management device 130 is operating to filter or coact an influent with the media 40, the media chamber 38 is filled with a media 40. When it is time to regenerate the media 40, the spent media 40 can be carried from the device 130 to a second media regeneration container where it is regenerated. During regeneration of the media 40 in the second container, the regenerated media 40 held in the first container 178 can be pumped into the media chamber 38 of the fluid treatment and media management device 130. The fluid treatment and media management device 130 can be placed into operation during the regeneration of the spent media in the second container.

Figure 12:
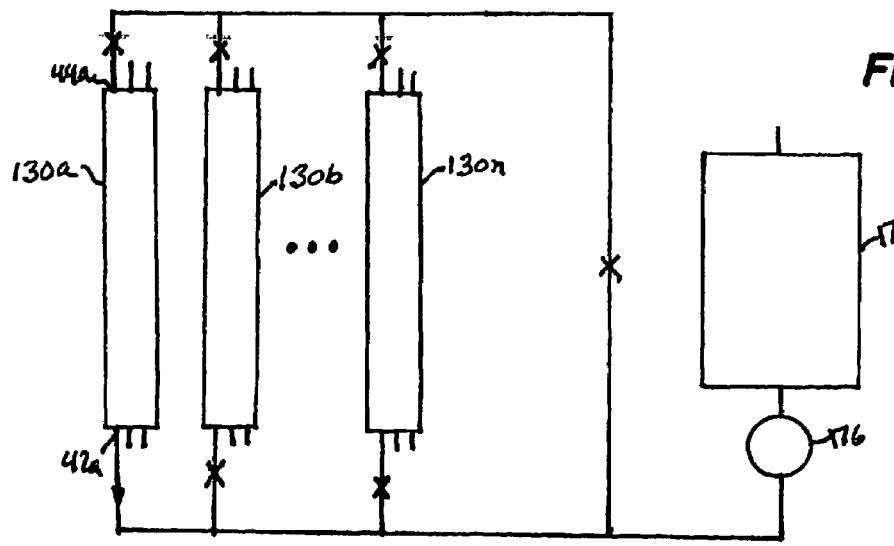
FIG. 12 illustrates a fluid treatment and media management system in which a plurality of fluid processing devices of FIG. 9a are employed with a common media regeneration system.

This same process can be carried out with a number of fluid treatment and media management devices 130a, 130b . . . . 130n as shown in FIG. 12. Here, a single media regeneration container 178 can be employed to sequentially regenerate the media 40 from plural fluid treatment and media management devices 130a-130n. Alternatively, plural media regeneration containers can be used to regenerate the media in a system employing plural fluid treatment and media management devices.

The foregoing system is well adapted for use with media that is difficult to fluidize within the device itself, as described in U.S. Pat. No. 6,322,704 by Martin. Such systems may include a fluid treatment and media management device using a zirconium powder as a media 40 to filter arsenic from water. The zirconium media can be regenerated chemically in the container 178, another regeneration system, or in the fluid treatment and media management device itself.

From the foregoing, the various advantages of the fluid treatment and media management device 130 are apparent. No backwash chamber is needed, although one could still be included where applicable. No orifices are needed for fluidization, although orifices could be used where applicable, such as where periodic backwashing of the media in the device is desirable. One check valve located inside the inner perforated cylinder 32 and approximately 4-5 inches down from the top thereof can be used to prevent channeling of the influent at the top during the filter or coaction cycle, if so desired or where needed. A mechanism is provided for fluidization of the media 40 out the bottom of the fluid treatment and media management device 130. In this case, the media 40 itself provides the resistance in both the outside annular and the inside cylinder to produce the axial forces necessary to discharge the media 40 out of the fluid treatment and media management device 130, along with gravity working with the fluidization process instead of against it, as is the case where the media is fluidized to the top of the device, and gravity works against the fluidizing process. The media may be completely removed to an external vessel separate from the fluid treatment and media management device 130. The end caps can be formed with media access thru ports, channels, grooves or other means so media can be discharged from the fluid treatment and media management device. After the media 40 is discharged thru the outlet media access channel 42, it may be followed by a filter or spray cycle to remove any of the residual media 40 that may remain in the device, especially any media that may be next to the inside of the screen covering the inner perforated cylinder 32. Fluidization of the media 40 out of the outlet media access channel 42 provides a superior job of removing any media stuck to the inside of the outside screen, as compared to fluidization of the media occurring in the top of the backwash chamber. The individual outer solid case that normally forms the annular space with the outside perforated cylinder is often not necessary, as in the situation where multiple media columns are used in a single case. Fluid treatment and media management devices may be placed vertically or horizontally and recharged with new or regenerated media while in place, or removed and regenerated either vertically or horizontally, or even inverted. A quick-connect connection on the end caps could replace the port or media access channels and allow for quick media change out. The media regeneration process can take place in the fluid treatment and media management device itself, with or without a backwash chamber perforations formed along the length of both the inner perforated cylinder and the outer perforated cylinder can be along the entire lengths of both cylinders, or only some portion thereof.

Figure 13:
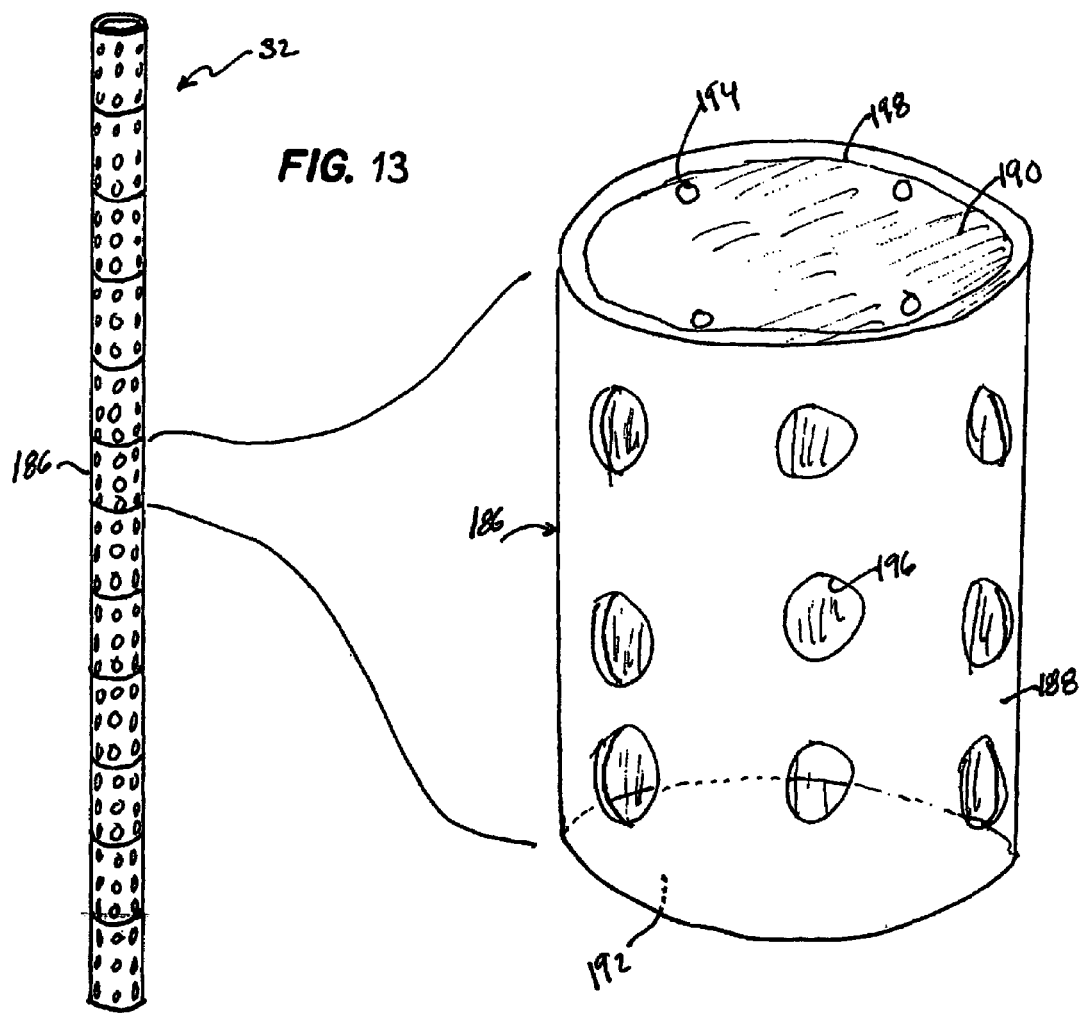
FIG. 13 illustrates a perforated cylinder constructed according to an embodiment of the invention, with one segment shown in enlarged form.

In accordance with another feature of the invention, the inner perforated cylinder 32 can be constructed in a segmented manner, such as shown in FIG. 13. In a preferred embodiment, the inner perforated cylinder 32 is constructed of a synthetic moldable material, such as plastic. Moreover, the inner perforated cylinder 32 is fabricated with a number of similarly-made segments, one shown enlarged as reference numeral 186. Each segment 186 is fixed together in an end-to-end manner to form the column and thus the entire inner perforated cylinder 32. This overcomes the problem in producing long-length items by plastic molding processes. Because draft angles are required in molding items, long items are difficult to make by conventional molding processes without compromising the percent open area.

Each segment 186 is preferably molded from any type of moldable material. In the preferred form of the invention, a durable plastic is used with fluid treatment and media management devices processing water-based influents. Each segment 186 includes a tubular sidewall 188 with a top plate 190 and an open bottom 192. The top plate 190 is recessed somewhat from the annular edge of the segment 186, and includes one or more orifices 194 to facilitate fluidization of the media in the device, such as described in detail in the Martin U.S. Pat. No. 6,322,704. The segment 186 can be molded with a line of weakness 198 so that the top plate 190 can be removed in the event that the orifices are not needed, such as the embodiment of the fluid treatment and media management device 130 described above in connection with FIG. 9a. The top plate 190 can be drilled with a large hole in the event that no orifices are needed. The top plate 190 can also remain unmodified to provide a plug, such as may be used in the inner perforated cylinder 32. Alternatively, the segment 186 can be molded without any end plates 190. The orifices 194 can be drilled into the top plate 190 with different sizes and different patterns in the various segments 186.

Formed in the sidewall 188 of the segment 186 during the molding process are perforations 196. Alternatively, the perforations 196 can be formed during the molding process as "knock-out" structures which can be removed by an impact during the assembly of the column of segments 186 to form the inner perforated cylinder 32. If it is desired to form an aperture in the sidewall 188, then the particular knock-out can be punched through the sidewall 188, thereby forming the perforation. In the event large diameter media is employed, then small holes can be drilled in the sidewall 188 of the segment 186. In this event, the use of a screen is not necessary.

The segments 186 can be molded in various diameters, and with desired axial lengths. For example, a segment adapted for use in making an inner perforated cylinder 32 can be two inches in diameter and three inches long. Thus, in order to fabricate an inner perforated cylindrical 32 of an overall length of five feet; twenty, three-inch long segments 186 would be employed.

The segments 186 can be fixed together to form a column by bonding the annular edges of the segments 186 together. The bonding agent can be an adhesive, a chemical weld, a thermal weld or any other means suitable for fixing plastic elements together. In the preferred form, the segments 186 are spin welded together. According to this technique, the segments 186 to be fixed together are rotated in opposite directions at a high speed. The segments 186 are then brought together at the annular edges, whereupon the contact therebetween causes heat to be generated. The heat melts the plastic material so that it flows together and forms a unitary and strong unit. Additional segments 186 are added to the partially formed column to build an inner perforated cylinder 32, such as shown in FIG. 9a. This provides an economical and efficient method of forming the inner perforated cylinders and allows for various model lengths and sizes by varying the number of parts assembled. The outer perforated cylinder 22 can be fabricated in the same manner.

In a preferred form of the invention, the inner perforated cylinder 32 is formed using a length of a cylindrical plastic pipe with perforations formed therein. A lateral slot is cut into the pipe at locations where there is to be an orifice plate or a plug. A disc-like plate is then inserted into the slot to block off the central bore of the inner perforated cylinder. The disc-like structure would have holes in it to function as orifices, or no holes to function as a plug. The disc-like structure is then sealed or welded to the perforated pipe to seal the pipe around the lateral slot.

Figure 14:
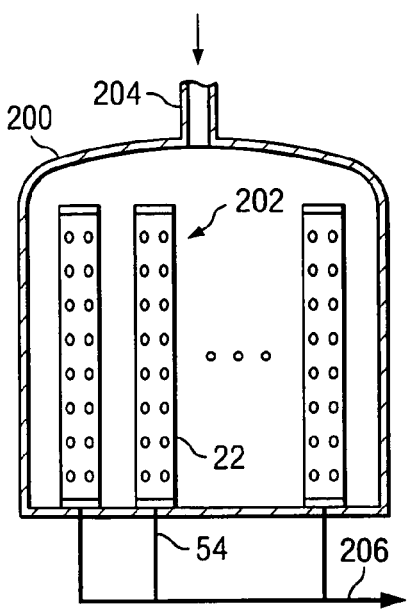
FIG. 14 illustrates a number of fluid treatment and media management devices, without cases, housed within a large vessel, for simultaneously processing an influent.

FIG. 14 illustrates a fluid treatment and media management system where devices 130 similar to that shown in FIG. 9a are employed in a large vessel 200. The devices 202, of which there may be many in the vessel 200 are like that of FIG. 9a, but without the respective outer cases 16. Rather, the influent entering the vessel 200 through the inlet 204 is carried directly to the outside surface of the outer perforated cylinders 22. The influent is filtered or otherwise treated by being carried radially through the media 40. The treated fluid exits the individual devices 202 via the respective bottom central ports 54. The bottom central ports 54 of each of the devices 202 are plumbed together into a common outlet 206. With this arrangement, only a single large vessel 200 is employed, rather than a case 16 on each of the individual devices 202.

The piping for the other ports of the devices 202 is not shown in FIG. 14, but would be apparent to those skilled in the art in view of the foregoing description. In this case, fluidization of the media for external regeneration, if needed, would be out the bottom of each device 202 and out the bottom of the vessel 200 through other connections (not shown). An accompanying media fill cycle would be utilized, either back through the bottom or in through the top media access channels of the devices 202.

Figure 15:
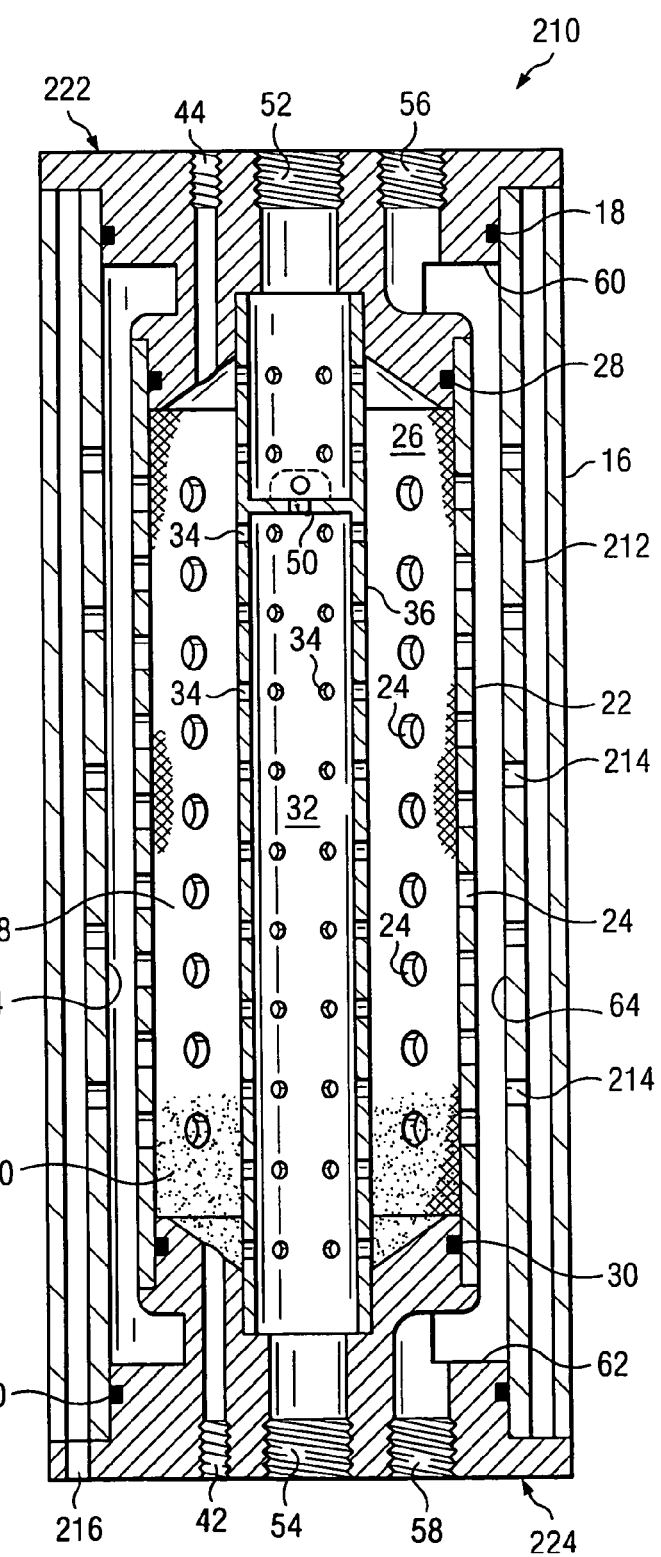
FIG. 15 illustrates a fluid treatment and media management device according to an embodiment in which a spray liner is used to periodically clean the screen.

FIG. 15 illustrates another embodiment of a fluid treatment and media management device 210 for use in treating an influent with a media by way of coaction or filtering. The device 210 is similar to that shown in FIG. 9a, but includes a spray liner 212. The spray liner 212 is situated between the case 16 and the outer perforated cylinder 22. The spray liner 212 includes a small hole or jet 214 located therein in a position aligned with each perforation 24 of the outer perforated cylinder 22. In the example, the spray liner 212 includes a small hole 214 or jet radially aligned with the perforation 24 of the outer perforated cylinder 22. The top and bottom end caps 222 and 224 are constructed to hold the spray liner 212 and the case 16 in the position shown. The bottom end cap 224 includes a port 216 connected to a source of air pressure. The air pressure port 216 could also be formed in the top end cap 222, or both the top and bottom end caps 222 and 224, or in the case 16.

In operation of the device 210, once it is determined that the outside surface of the filter media 40 is clogged with particulate matter, especially in the media area exposed by the perforations 24 formed in the outer perforated cylinder 22, the particulate matter can be removed from the outer screen 26 by use of the spray liner 212. The device 210 is temporarily taken off line and all valves to the device 210 are closed. The device 210 is then pressurized to a desired pressure via the air port 216. The valve connected to the bottom annulus port 58 is abruptly opened. The valve connected to the top annulus port 56 can also be opened. In any event, the pressure within the device 210 is quickly relieved, which causes the pressurized air to jet liquid through the small holes 214 in the spray liner 212 and be directed to the respective screen-covered perforations 24 of the outer perforated cylinder 22. The jets of pressurized liquid cause the particulate matter clogging the outer screen 26 to be dislodged and carried to the bottom of the device 210. The dislodged particulate matter can be carried out of the device 210 and disposed of appropriately. The velocity of the pressurized air in combination with the mass of the liquid provides an excellent mechanism for dislodging the caked particulate matter from the outer screen 26. The close proximity of the jets 214 formed in the spray liner 212, to the screened perforations in the outer perforated cylinder 22, facilitate the generation of a higher impact of the jet stream on the outer screen 26.

The advantage of the use of the spray liner 212 is that the time between backwashing can be substantially lengthened, by a factor of 4 or 5, or more. For example, when it determined that the media 40 is clogged with particulate matter, the use of the air jets can be used once an hour, rather than backwashing, and then the device 210 can be backwashed at five-hour intervals. An additional advantage is that very little, if any, water is needed during the spray cleaning cycle. Another advantage is the total life of the fluid treatment and media management device 210 may be greatly prolonged because progressive fouling of the outer screen 26 will be avoided or greatly slowed down. Those skilled in the art may find that jets of both air and a liquid can be used, or a gas other than atmospheric air.

In addition to the foregoing, the spray liner 212 of the device of FIG. 15 can be employed in the cross-flow device in order to facilitate axial flow of the large particles, and deter such particles from being carried in a radial direction through the holes 214 of the spray liner 212 and to the media 40. In this case, the influent would be input in to the annular area between the case 16 and the spray liner 212 through modified end caps 222 and 224. The spray liner 212 in this embodiment functions to prefilter the influent and deter the larger particles from flowing radially to the media 40.

Figure 16:
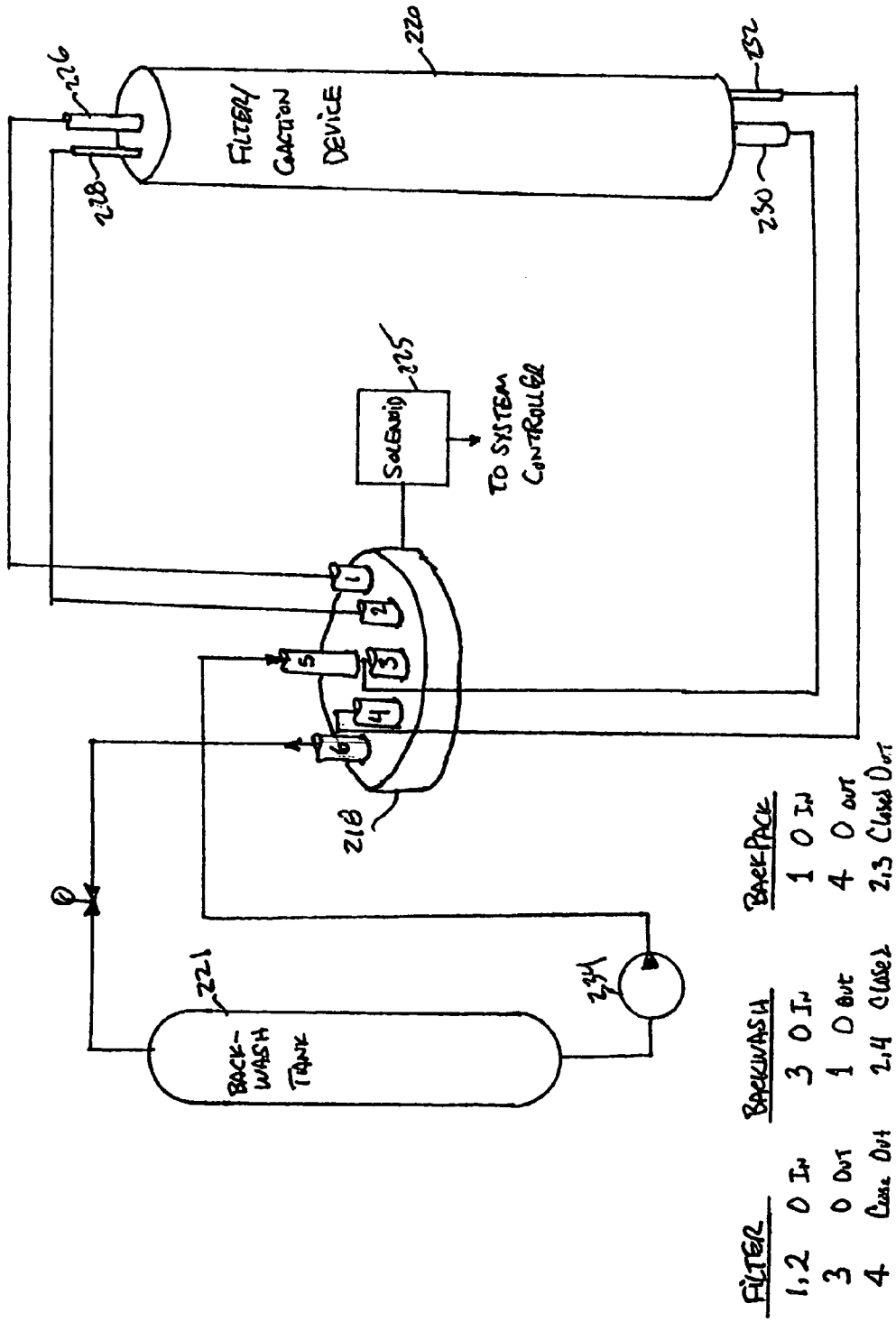
FIG. 16 is a diagram of a fluid treatment and media management system employing a stacked valve adapted for control so that the fluid treatment and media management device can be interconnected to associated equipment to carry out the various cycles.

Filter and coacting devices are incorporated into many types of treatment systems. The devices are controlled by a number of solenoid-operated valves, and often by a process controller. The solenoid valves are expensive, and thus a reduction of the number of valves represents a reduction in equipment costs. FIG. 16 illustrates a demonstration system including a filter/coaction device 220, a backwash tank 221 and a multiport valve 218 controlled by a solenoid 225. The control of the multiport valve 218 is by a system controller (not shown) to rotate the valve 218 and allow the interconnection and open/closed condition of the various ports. This valving arrangement thus simplifies the system connections to the filter/coaction device 220, at a reduced expense.

The filter/coaction device 220 may be of the radial flow type with a central inlet port 226 coupled to an inner perforated cylinder. A top outside annular port 228 is coupled to the annular area between the case and the outer perforated cylinder. At the bottom of the filter/coaction device 220, there is a central outlet port 230 and a bottom outside annular port 232. The various connections between the filter/coaction device 220 and the multiport valve 218 are shown in FIG. 16. The backwash tank 221 is connected to a pump 234 and thus to the central port 5 of the multiport valve 218. The inlet of the backwash tank 221 is connected to port 6 of the multiport valve 218.

The multiport valve 218 is configured so that ports 5 and 6 are always open. The state of the other ports of the multiport valve 218 is as shown in the legend of FIG. 16. In addition, the state of the ports is shown for the various filter cycles, namely, the filter cycle, the backwash cycle and the backpack or purge cycle. The system controller controls the rotation of the multiport valve to positions to achieve the various cycles.

Figure 17A:
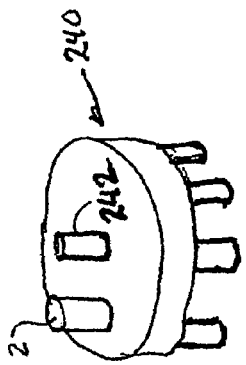
FIG. 17a illustrates the stacked multiport valve of FIG. 16.

According to another embodiment of the invention, there is shown in FIGS. 17a-17d a six-position multiport valve 240 for use with systems employing plural cycles. FIG. 17a illustrates the physical nature of the multiport valve 240, with a fluid inlet port 2 in the top of the valve which feeds the fluid to the other ports as a function of the rotary position of the control shaft 242. The control shaft 242 is rotated by an electrical mechanism (not shown) which, in turn is controlled by the system controller. The shaft 242 can be rotated to six different positions, corresponding to different cycles of the system. In a system employing a fluid treatment and media management device, the cycles may include a filter cycle, a pressure-up cycle (air), an annular purge cycle (air and water), a backwash cycle, a blow down or backpack cycle and a rinse cycle.

Figure 17D:
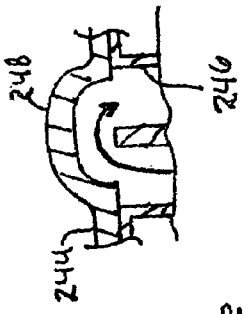
FIGS. 17b and 17d illustrate the details of the rotatable top plate of the stacked valve.
Figure 17B:
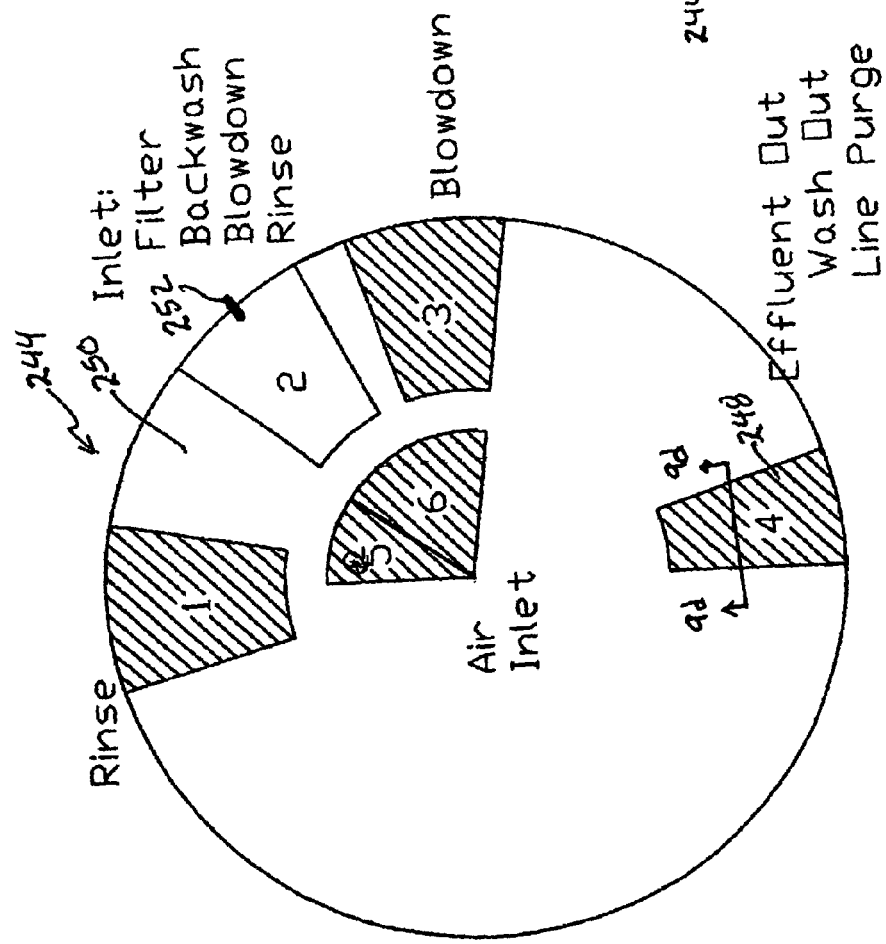
Figure 17C:
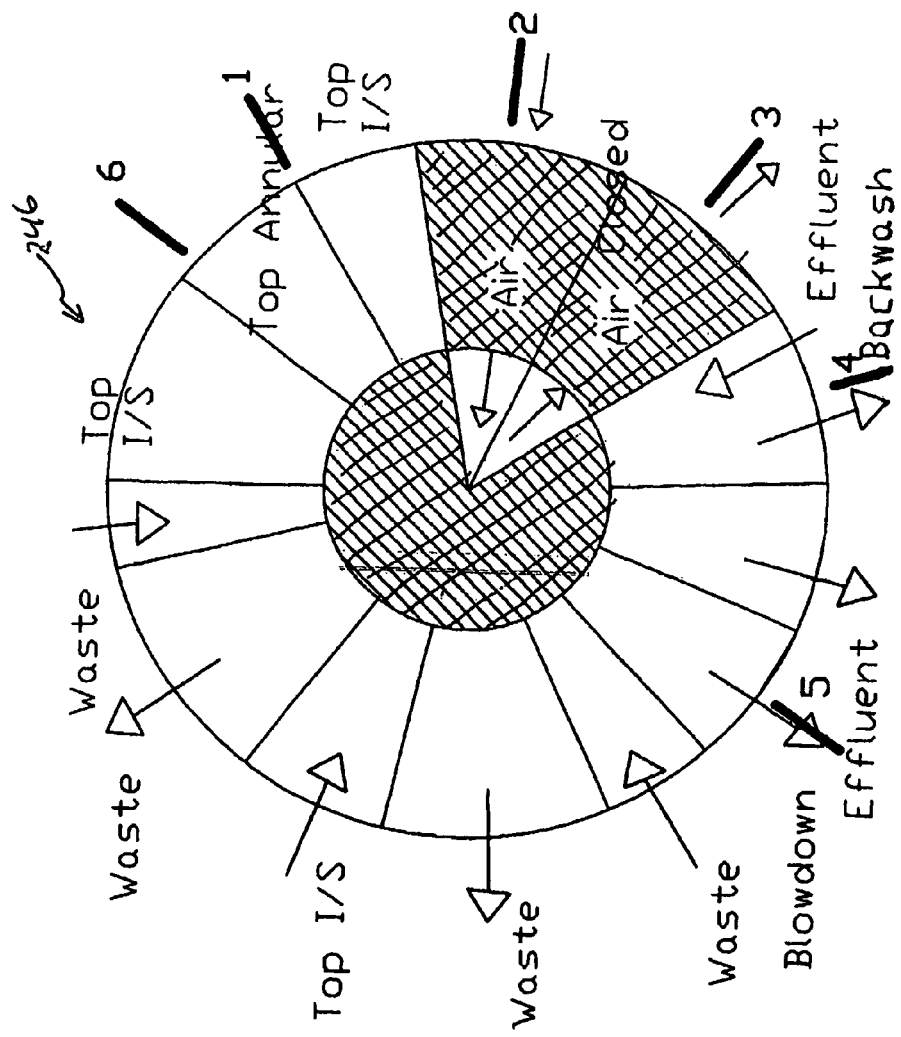
FIG. 17c illustrates the construction of a bottom plate of the stacked valve.

FIG. 17b illustrates the top plate 244 of the multiport valve 240, and FIG. 17c illustrates the bottom plate of the valve 240. The top plate 244 moves with the control shaft 242, whereas the bottom plate 246 remains stationary. The cross-hatched areas of the top plate 244 are concaved upwardly, as shown in FIG. 17d by numeral 248, to allow communication between two fluid channels of the bottom plate 246. The concave areas 248 function as an open valve between the two fluid channels of the bottom plate 246. The flat areas, such as 250, of the top plate 244 are effective to close off two adjacent channels of the bottom plate 246 and effectively function as a closed valve therebetween.

The top plate 244 is made rotatable over the bottom plate 246 to six index positions. The top plate 244 can be rotated so that the index mark 252 thereon aligns with one of the six index marks of the bottom plate 246, shown as short heavy lines in FIG. 17c. If the top plate 244 is superimposed over the bottom plate 246 so that the top index mark 252 is aligned with the various index marks of the bottom plate 246, then it can be seen how the various fluid channels are either coupled to adjacent fluid channels, or are blocked.

Fluid input to the top port 2 is carried to all upper areas of the top plate 244, and thus is coupled to open channel 2. Depending on the indexing of the top plate 244, the fluid is coupled from top port 2 to other open channels of the bottom plate 246. The inlet fluid carried by port 2 of the top plate 244 is used in the filter cycle, the backwash cycle, the blowdown (backpack) cycle and the rinse cycle. The rinse cycle is utilized to clean the fluid treatment and media management device with fresh water subsequent to a backwash cycle and prior to the filter cycle to cleanse the device of any backwash residue. The various channels of the bottom plate 246 include the top annular of the fluid treatment and media management device, the top inner perforated cylinder (I/S), the effluent, blowdown (backpack) and waste.

The six-position multiport valve 240 has four positions for liquids, and two positions for a gas. Importantly, there is provided near the center of the top plate 244 and the bottom plate 246 ports or channels for carrying a fluid, which may be air, gas or a liquid. The cross-hatched portion of the bottom plate 246 shown in FIG. 17c represents planar plate portions thereof. Index positions 2 and 3 corresponds to cycles where pressurized air can be injected into the fluid treatment and media management device. Importantly, the multiport valve 240 is constructed so that the liquid portions and the air portions are maintained separate and isolated. This is advantageous when the system is used to filter drinking water. The valve port isolation feature keeps the filter cycle ports and channels completely separated from the backwash cycle ports and channels and prevents contamination.

The foregoing multiport valve 240 can be configured to carry out many other types of cycles, different from that described above. For example, when it is desired to carry out a media exchange cycle and no spray liner is used, the pressure-up cycle and the annular purge cycle can be replaced with a media discharge cycle and a media fill cycle. The cycles can be changed and substituted for other cycles by changing the plumbing external to the multiport valve 240.

Figure 18:
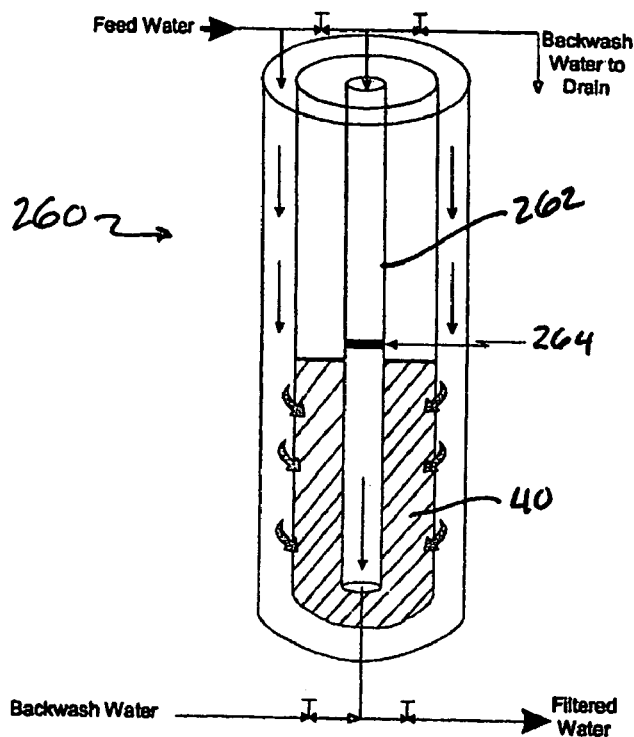
FIG. 18 illustrates a standard pressure filter.

FIG. 18 illustrates a radial flow fluid treatment and media management device 260 incorporating many of the features of the invention. The device 260 is shown in simplified form. In this device 260, the inner perforated cylinder 262 has a media 40 filling only the bottom half of the media chamber. A plug 264 separates the top of the inner perforated cylinder 264 from a bottom portion thereof. Feed water is input into the top center port during filtering, and the backwash liquid is extracted from such port during the backwash cycle in which the media 40 is fluidized to the upper part of the media chamber.

Figure 19:
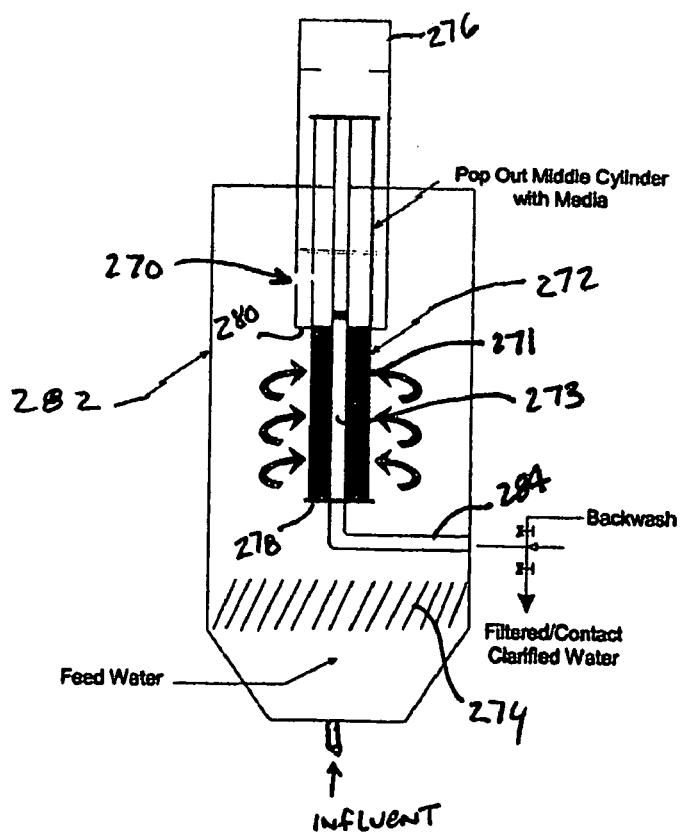
FIG. 19 illustrates a submerged fluid processing device with a clarifier.

FIG. 19 illustrates a submerged type of filter 270 employed in a clarifier 282. The submerged filter 270 does not include an outer case, but rather an outer perforated cylinder 271 that is exposed to the influent pumped into the clairfier 282. The outer perforated cylinder 271 and an inner perforated cylinder 273, with a media contained therebetween, define a radial flow media column 272. The inner perforated cylinder 273 has a bottom 278 connected to flexible piping 284 for carrying backwash liquid in one direction, or filtered liquid in the other direction. The clarifier 282 includes in a standard manner a number of settling plates 274 at the bottom thereof. The submerged filter 270 includes an enclosure 276 fixed to the clairifer 282. The submerged filter 270 is adapted for moving telescopically within the enclosure 276. The filter 270 can be moved upwardly by a hoist mechanism, a hydraulic system or other suitable means.

In operation of the system of FIG. 19, the radial flow media column 272 is placed in it lower position, as shown, whereupon the influent in the clarifier 282 passes radially through the media column 272, down the inner perforated cylinder 273, and exits out of the clarifier 282 via the flexible tubing 284. When it is desired to backwash the submerged filter 270 to remove the particulate matter from the media column 272, the media column 272 is raised up in the enclosure 276 until the bottom plate 278 abuts against the bottom edge 280 of the enclosure 276. In this position, the filter 270 can undergo a backwash cycle to regenerate the media, without removing the submerged filter 270 from the clarifier 282.

The submerged filtration technique can also be carried out in alternative ways. For example, a clarifier may or may not be used at all. The filter unit 270 can be equipped with a case 16, such as shown in FIG. 1b. The lifting mechanism for the filter 270 may not be necessary during the fluidizing and regeneration cycle. Instead, the fluidizing of the filter 270 may be carried out of the bottom of the filter 270 through a port and carried external to the clairifier 282. In the event that the lifting mechanism is employed, it can be a cable and winch, or hydraulic, in which event the hydraulic fluid is introduced into a bottom plate section and forced to the filter 270 to displace it into the outer casing located either above or below the filter 270 to fluidize the media.

In addition to the foregoing features of the invention, other features are available. An air backwash cycle can be employed where air may be injected into the inner perforated cylinder at frequent intervals to prolong the device treatment cycle. The air injected into the inner perforated cylinder from a central filter port, tends to release the particulate matter from the media and temporarily regenerate the media without a backwash cycle. This is not the same as the air injected in the outside liner. An air backwash cycle can be initiated where air is introduced every 10 seconds or so for a two-second interval into the inner perforated cylinder. This has the effect of allowing the device to operate for hours versus minutes between backwash cycles. In addition, no liquid is used whatsoever in the process which is an important resource conservation advantage. In operation, the effluent valve is shut off, then the air is piped into the inner perforated cylinder and then allowed to exit the outside annular through either the bottom or top cap. The pulsed air dislodges the particulate matter from the outer surface of the media and carries the dislodged matter out of the device.

According to yet other features of the invention, the following is noted. Manual disassembly of the fluid treatment and media management device can be achieved for either changing out the media by removing either of the two threaded end caps, or a complete restoration of the filter including replacing the screens and media. The fluid treatment and media management device may be equipped with a top inside perforated cylinder bladder. This involves placing a membrane or bladder in the top backwash chamber portion of the devcie, inside the inner perforated cylinder, and then forcing it to expand out and press against the inside surface of the perforations at the top, by introducing either air or water into the membrane or bladder to inflate it. This effectively makes the top backwash inside cylinder as if it had no perforations during the fluidization cycle. This increases the axial forces lifting the media in the top backwash chamber. Fluidization pulsing can also be utilized. This is where the fluidizing fluid is pulsed by quickly turning an associated valve open and closed repeatedly. This increases the velocity in the axial direction of the device, thereby further increasing the lifting capacity of the filter. A pressure tank with bladder therein can be used to replace an air compressor for air injection during the spray liner cycle. This provides a source of pressurized fluid for the spray liner function. The funnel structure in the molded end caps helps lift the dead zone or area of no flow at the bottom of the end cap during the fluidization cycle. The funnel structure facilitates complete fluidization of the media from the bottom of the media chamber. Without the funnel structures, there is often left in the bottom of the media chamber 2-4 inches of media during fluidization.

A backwashable screen can by utilized in the fluid treatment and media management device. Due to the unique combination of screen and media interface, especially in regards to the outer perforated cylinder, a virtual invisible screen exists. When particles contact this barrier they are prevented from moving through if they are larger than the media or the screen. One of two things can happen, either they will stop at the outside of the screen or pass on into the media and be stopped. If they pass on into the media then they are removed during the fluidization or backwash cycle. If the particles stay on the outside of the screen they will be removed either during the blowdown cycle or the spray liner cycle and removed in both cases out the annular port either at the top or bottom end cap. It should be noted by controlling the size of the particles in the upstream influent (e.g. through sequential filtration or proper sizing of the filter media and screen) the location of the solids can be controlled. The media screen relationship is such that for round spherical media, the interstitial spacing in the media is approximately $1/7$ of the outside diameter of the media itself, allowing for a screen sizing of approximately 15 times larger than the media itself. This can be further increased where angular media is utilized in place of the round spherical media particles. Media actually smaller than the screen can be used if it is packed to allow for bridging across the screen holes by multiple media.

While the preferred and other embodiments of the invention have been disclosed with reference to specific fluid treatment and media management devices and associated equipment and functions, it is to be understood that many changes in detail may be made as a matter of engineering choices without departing from the spirit and scope of the invention, as defined by the appended claims.

What is claimed is:

1. A method of operating a fluid treatment device employing a non-bonded media for treating the fluid, comprising the steps of:
    containing the non-bonded media in an annular chamber located between an inner perforated cylinder and an outer perforated cylinder of said fluid treatment device;
    passing an influent radially through the non-bonded media for treatment of the influent during a treatment operation; and
    passing a purge fluid down an upper portion of the inner perforated cylinder during a packing operation and then outwardly into the annular chamber to pack the non-bonded media in the annular chamber; and
    during the packing operation passing the purge fluid through the outer perforated cylinder in a direction to carry with it particulate matter accumulated on the outside of said outer perforated cylinder to a location outside of a housing that contains said inner perforated cylinder and said outer perforated cylinder.

2. The method of claim 1, further including carrying said purge fluid out of said fluid treatment device at an outlet port different from an outlet port of a treated influent.

3. The method of claim 1, further including passing the purge fluid during the packing operation through said outer perforated cylinder in a direction opposite a direction the influent passes through the outer perforated cylinder during the treatment operation.

4. The method of claim 1, further including closing the upper portion of the inner perforated cylinder during the treatment operation.

5. The method of claim 4, further including using a ball located above an orifice in a plate located in the upper portion of said inner perforated cylinder for closing and opening the upper portion of said inner perforated cylinder.

6. The method of claim 1, wherein the housing includes a top end cap with ports therein and a bottom end cap with ports therein and a case for said fluid treatment device where the top and bottom end caps cap the respective ends of said case, and wherein fluids are carried to and from said fluid treatment device only via the ports in said top and bottom end caps, and further including capturing said case and said inner and outer perforated cylinders between said top and bottom end caps.

7. The method of claim 1, further including increasing the velocity of the purge fluid passing through the outer perorated cylinder as a function of the accumulation of the non-bonded media in the lower portion of the annular chamber during the packing operation.

8. The method of claim 7, wherein the increased accumulation of the non-bonded media in the lower portion of the annular chamber during the packing operation reduces the area of the outer perforated cylinder through which the purge fluid can flow, thus increasing the velocity thereof.

9. The method of claim 8, further including removing the residue on the outside of the outer perforated cylinder with greater efficiency using the greater velocity of the purge fluid.

10. The method of claim 1, further including carrying out the packing operation after fluidizing the non-bonded media to dislodge particulate matter therefrom.

11. The method of claim 1, wherein an area of the outer perforated cylinder through which the purge fluid passes is reduced as the non-bonded media is packed in the lower portion of said annular chamber.

12. The method of claim 1, further including using the purge fluid to force the non-bonded media from the upper portion of said annular chamber to the lower portion of the annular chamber during the packing operation, and carrying residue with the purge fluid during the packing operation for disposal of the residue.

13. A method of operating a fluid treatment device employing a non-bonded media for treating the fluid, comprising:
    containing the non-bonded media in an annular chamber located between an inner perforated cylinder and an outer perforated cylinder of said fluid treatment device;
    passing an influent radially through the non-bonded media for treatment of the influent during a treatment operation;
    passing a purge fluid down an upper portion of the inner perforated cylinder during a packing operation and then outwardly into the annular chamber to pack the non-bonded media in the annular chamber; and
    using a top end cap with ports therein and providing a bottom end cap with ports therein, and using a case for said fluid treatment device where the top and bottom end caps cap the respective ends of said case, and wherein fluids are carried to and from said fluid treatment device only via the ports in said top and bottom end caps.

14. A method of operating a fluid treatment device employing a non-bonded media for treating the fluid, comprising:
    containing the non-bonded media in an annular chamber located between an inner perforated cylinder and an outer perforated cylinder of said fluid treatment device;
    passing an influent radially through the non-bonded media for treatment of the influent during a treatment operation;
    passing a purge fluid down an upper portion of the inner perforated cylinder during a packing operation and then outwardly into the annular chamber to pack the non-bonded media in the annular chamber; and
    closing an upper portion of the inner perforated cylinder during the purge operation, and opening the upper portion of the inner perforated cylinder during a backwash operation.

* * * * *